United States Patent
Wetsch

(10) Patent No.: US 10,328,653 B2
(45) Date of Patent: Jun. 25, 2019

(54) INFLATION AND SEALING DEVICE WITH INCLINED COMPONENTS

(71) Applicant: Pregis Innovative Packaging LLC, Deerfield, IL (US)

(72) Inventor: Thomas D. Wetsch, St. Charles, IL (US)

(73) Assignee: PREGIS INNOVATIVE PACKAGING LLC, Deerfield, IL (US)

( * ) Notice: Subject to any disclaimer, the term of this patent is extended or adjusted under 35 U.S.C. 154(b) by 751 days.

(21) Appl. No.: 14/630,642

(22) Filed: Feb. 24, 2015

(65) Prior Publication Data

US 2015/0239592 A1  Aug. 27, 2015

Related U.S. Application Data

(60) Provisional application No. 61/944,026, filed on Feb. 24, 2014, provisional application No. 61/944,030, (Continued)

(51) Int. Cl.
  *B65B 41/12* (2006.01)
  *B31D 5/00* (2017.01)
  (Continued)

(52) U.S. Cl.
  CPC ........ *B31D 5/0073* (2013.01); *B29C 49/0042* (2013.01); *B29C 66/439* (2013.01); *B65B 39/00* (2013.01); *B65B 41/16* (2013.01); *B65B 43/06* (2013.01); *B65B 51/10* (2013.01); *B65D 81/052* (2013.01); *B29C 65/02* (2013.01); *B29C 65/06* (2013.01); *B29C 65/08* (2013.01); *B29C 65/16* (2013.01); *B29C 66/0042* (2013.01); *B29C 66/0342* (2013.01); *B29C 66/1122* (2013.01);
  (Continued)

(58) Field of Classification Search
  CPC ....... B31D 5/0073; B65B 39/00; B65B 41/12; B65B 41/16; B65B 43/06; B65B 51/10; B65D 81/052; B29C 49/0042; B29C 65/02; B29C 65/06; B29C 65/08; B29C 65/16; B29C 66/0042; B29C 66/0342; B29C 66/1122; B29C 66/439; B29C 66/71; B29C 66/8122; B29C 66/83433
  USPC ....... 53/79, 389.2, 389.4, 403, 564, 574, 73; 156/495; 226/143, 158, 184, 195
  See application file for complete search history.

(56) References Cited

U.S. PATENT DOCUMENTS 3,010,267 A   11/1961   Richardson et al.
3,333,395 A    8/1967   Doucette et al.
(Continued)

OTHER PUBLICATIONS

PCT Search Report for International Patent Appln. No. PCT/US15/017393, PCT Search Report for International Patent Appln. No. PCT/US15/017393, dated May 26, 2015 (3 pages).
(Continued)

*Primary Examiner* — Gloria R Weeks
(74) *Attorney, Agent, or Firm* — Dorsey & Whitney LLP

(57) ABSTRACT

The present disclosure is related to an inflation and sealing device that can include a material support at an angle to a guide for an inflation and sealing mechanism. The device can have a material support with a discontinuous surface. The device may also have low- or non-stick surfaces and bump-off elements to prevent sticking to a cooling region or exit from the device.

16 Claims, 14 Drawing Sheets

Related U.S. Application Data filed on Feb. 24, 2014, provisional application No. 61/944,515, filed on Feb. 25, 2014.

(51) Int. Cl.

| | | |
|---|---|---|
| *B29C 49/00* | (2006.01) | |
| *B65D 81/05* | (2006.01) | |
| *B65B 39/00* | (2006.01) | |
| *B65B 41/16* | (2006.01) | |
| *B65B 43/06* | (2006.01) | |
| *B65B 51/10* | (2006.01) | |
| *B29C 65/00* | (2006.01) | |
| B29L 22/02 | (2006.01) | |
| B29C 65/08 | (2006.01) | |
| B29C 65/16 | (2006.01) | |
| B29C 65/02 | (2006.01) | |
| B29C 65/06 | (2006.01) | |

(52) U.S. Cl.
CPC .......... *B29C 66/71* (2013.01); *B29C 66/8122* (2013.01); *B29C 66/83433* (2013.01); *B29C 2049/0057* (2013.01); *B29L 2022/025* (2013.01); *B31D 2205/0023* (2013.01); *B31D 2205/0047* (2013.01); *B31D 2205/0064* (2013.01); *B31D 2205/0082* (2013.01)

(56) References Cited

U.S. PATENT DOCUMENTS

| | | | |
|---|---|---|---|
| 3,377,773 A | | 4/1968 | Clark |
| 3,487,755 A | | 1/1970 | Hillerns |
| D220,997 S | | 6/1971 | Svezia et al. |
| 3,660,189 A | | 5/1972 | Troy |
| D234,731 S | | 4/1975 | McDonald |
| D239,580 S | | 4/1976 | Robertson |
| 4,017,351 A | | 4/1977 | Larson et al. |
| 4,075,818 A | | 2/1978 | Wright et al. |
| 4,215,524 A | | 8/1980 | Saylor |
| 4,244,158 A | | 1/1981 | Nelham |
| 4,350,003 A | | 9/1982 | Greenwalt et al. |
| 4,359,361 A | | 11/1982 | Wright et al. |
| 4,412,879 A | | 4/1983 | Ottaviano |
| 4,848,063 A * | | 7/1989 | Niske ................ B65B 9/2035 53/451 |
| 4,876,842 A * | | 10/1989 | Ausnit ................ B29C 66/98 53/410 |
| 5,427,830 A | | 6/1995 | Pharo |
| D360,310 S | | 7/1995 | Stamberg et al. |
| D360,311 S | | 7/1995 | Stamberg et al. |
| D360,534 S | | 7/1995 | Gempton |
| 5,447,009 A | | 9/1995 | Oleksy et al. |
| 5,449,156 A * | | 9/1995 | Gnuechtel ........... B65H 23/192 226/195 |
| 5,460,844 A | | 10/1995 | Gaylor et al. |
| 5,620,542 A | | 4/1997 | Avila et al. |
| 5,673,542 A * | | 10/1997 | Vartanian ............ B65B 11/025 53/390 |
| 5,678,392 A | | 10/1997 | Konno et al. |
| D399,661 S | | 10/1998 | Smith |
| 5,918,441 A | | 7/1999 | Baker |
| 6,038,839 A | | 3/2000 | Linkiewicz |
| D422,422 S | | 4/2000 | Black |
| 6,212,859 B1 | | 4/2001 | Bielik, Jr. et al. |
| 6,283,296 B1 | | 9/2001 | Newman |
| 6,460,313 B1 | | 10/2002 | Cooper |
| 6,546,867 B1 * | | 4/2003 | Franklin ............... B65H 20/02 101/378 |
| 6,622,767 B2 | | 9/2003 | Stork |
| 6,641,079 B1 * | | 11/2003 | Siebenmann ........ B65H 29/006 242/528 |
| 6,659,150 B1 | | 12/2003 | Perkins et al. |
| 6,719,867 B1 | | 4/2004 | Mileti et al. |
| 6,751,926 B1 | | 6/2004 | Cooper |
| 6,800,162 B2 | | 10/2004 | Kannankeril et al. |
| 6,804,933 B2 * | | 10/2004 | Sperry ................. B31D 5/0073 156/145 |
| 6,889,739 B2 | | 5/2005 | Lerner |
| 6,932,134 B2 | | 8/2005 | Selle et al. |
| 6,944,419 B2 * | | 9/2005 | Kawamoto ........ G03G 15/2025 399/327 |
| 7,000,767 B2 | | 2/2006 | Tanaka et al. |
| 7,059,097 B2 * | | 6/2006 | Perkins ................ B31D 5/0073 53/403 |
| 7,059,103 B2 | | 6/2006 | Ninomiya et al. |
| 7,165,375 B2 * | | 1/2007 | O'Dowd .............. B31D 5/0073 53/385.1 |
| 7,254,929 B1 | | 8/2007 | Schutz et al. |
| D560,919 S | | 2/2008 | Simons, Jr. |
| 7,328,541 B2 | | 2/2008 | Garceau |
| 7,328,884 B2 | | 2/2008 | Garceau |
| 7,507,311 B2 | | 3/2009 | O'Dowd |
| 7,568,327 B2 * | | 8/2009 | Lancaster, III ....... B65B 11/006 53/210 |
| 7,578,333 B2 | | 8/2009 | Greenwood et al. |
| 7,908,829 B2 | | 3/2011 | Ligon et al. |
| 7,913,848 B2 | | 3/2011 | Liao et al. |
| 7,950,433 B2 | | 5/2011 | Sperry et al. |
| 8,015,781 B2 * | | 9/2011 | Kent ..................... B65B 5/108 53/245 |
| 8,029,428 B2 | | 10/2011 | Selle et al. |
| 8,061,110 B2 | | 11/2011 | Wetsch |
| 8,128,770 B2 | | 3/2012 | Wetsch et al. |
| 8,136,990 B2 | | 3/2012 | Piucci et al. |
| 8,240,533 B2 | | 8/2012 | Wetsch |
| 8,366,594 B2 | | 2/2013 | Zhang et al. |
| 8,402,719 B2 | | 3/2013 | Birkle |
| 8,454,779 B2 * | | 6/2013 | Wetsch ................ B29C 65/18 156/147 |
| 8,567,653 B2 | | 10/2013 | Wetsch et al. |
| D698,177 S | | 1/2014 | Nguyen et al. |
| D698,178 S | | 1/2014 | Nguyen et al. |
| D698,179 S | | 1/2014 | Nguyen et al. |
| D698,564 S | | 2/2014 | Behar et al. |
| 8,689,529 B2 * | | 4/2014 | Rearick ................ B65B 9/093 156/510 |
| 8,695,311 B2 * | | 4/2014 | Daigle ................. B29C 65/18 53/64 |
| 9,067,378 B2 | | 6/2015 | Wetsch et al. |
| D740,039 S | | 10/2015 | Bouroullec et al. |
| 9,168,715 B2 | | 10/2015 | Wetsch et al. |
| D758,777 S | | 6/2016 | McKenna et al. |
| D787,206 S | | 5/2017 | Webb |
| 9,994,343 B2 | | 6/2018 | Wetsch |
| 2002/0035022 A1 | | 3/2002 | Fioretti |
| 2004/0154146 A1 * | | 8/2004 | Pruitt, Jr. ............ B65H 23/0251 26/99 |
| 2004/0217514 A1 | | 11/2004 | Kannankeril et al. |
| 2006/0011291 A1 | | 1/2006 | O'Dowd |
| 2006/0042184 A1 | | 3/2006 | Perkins et al. |
| 2006/0210738 A1 | | 9/2006 | Slovencik et al. |
| 2007/0011989 A1 * | | 1/2007 | Sperry ................. B31D 5/0073 53/403 |
| 2008/0041023 A1 | | 2/2008 | Tsuruta |
| 2008/0066852 A1 | | 3/2008 | Wetsch et al. |
| 2008/0193055 A1 | | 8/2008 | Chen |
| 2009/0178372 A1 * | | 7/2009 | Fuss ..................... B31D 5/0073 53/403 |
| 2009/0293427 A1 * | | 12/2009 | Lerner ................. B31D 5/0073 53/403 |
| 2011/0233101 A1 | | 9/2011 | Baines |
| 2011/0239592 A1 | | 10/2011 | Willey |
| 2011/0247725 A1 | | 10/2011 | Frayne et al. |
| 2012/0000807 A1 | | 1/2012 | Scarbrough et al. |
| 2012/0186197 A1 * | | 7/2012 | Potempa ............... B65B 7/06 53/452 |
| 2013/0239519 A1 | | 9/2013 | Orsini et al. |
| 2013/0255868 A1 | | 10/2013 | Kannankeril et al. |
| 2013/0333338 A1 | | 12/2013 | Mellin et al. |
| 2014/0069921 A1 | | 3/2014 | Kristal |
| 2014/0109524 A1 * | | 4/2014 | Nelson ................. B65B 61/00 53/462 |

(56) References Cited

U.S. PATENT DOCUMENTS

| | | |
|---|---|---|
| 2014/0119677 A1 | 5/2014 | Lerner |
| 2014/0260094 A1 | 9/2014 | Wehrmann |
| 2014/0261752 A1 | 9/2014 | Wetsch |
| 2014/0261871 A1 | 9/2014 | Wetsch |
| 2015/0033669 A1 | 2/2015 | Dobreski et al. |
| 2015/0151864 A1 | 6/2015 | Lin |
| 2015/0283781 A1 | 10/2015 | Wetsch et al. |
| 2016/0176144 A1 | 6/2016 | Johnson et al. |
| 2017/0029146 A1* | 2/2017 | Palumbo ................ B65B 11/52 |

OTHER PUBLICATIONS

PCT Written Opinion of International Patent Appln. No. PCT/US15/017393, PCT Written Opinion of International Patent Appln. No. PCT/US15/017393, dated May 26, 2015 (7 pages).

United States Patent and Trademark Office, International Search Report for International Application No. PCT/US2015/017402 dated May 26, 2015, 2 pages.

United States Patent and Trademark Office, Written Opinion of the International Searching Authority for International Application No. PCT/US2015/017402 dated May 26, 2015, 11 pages.

\* cited by examiner

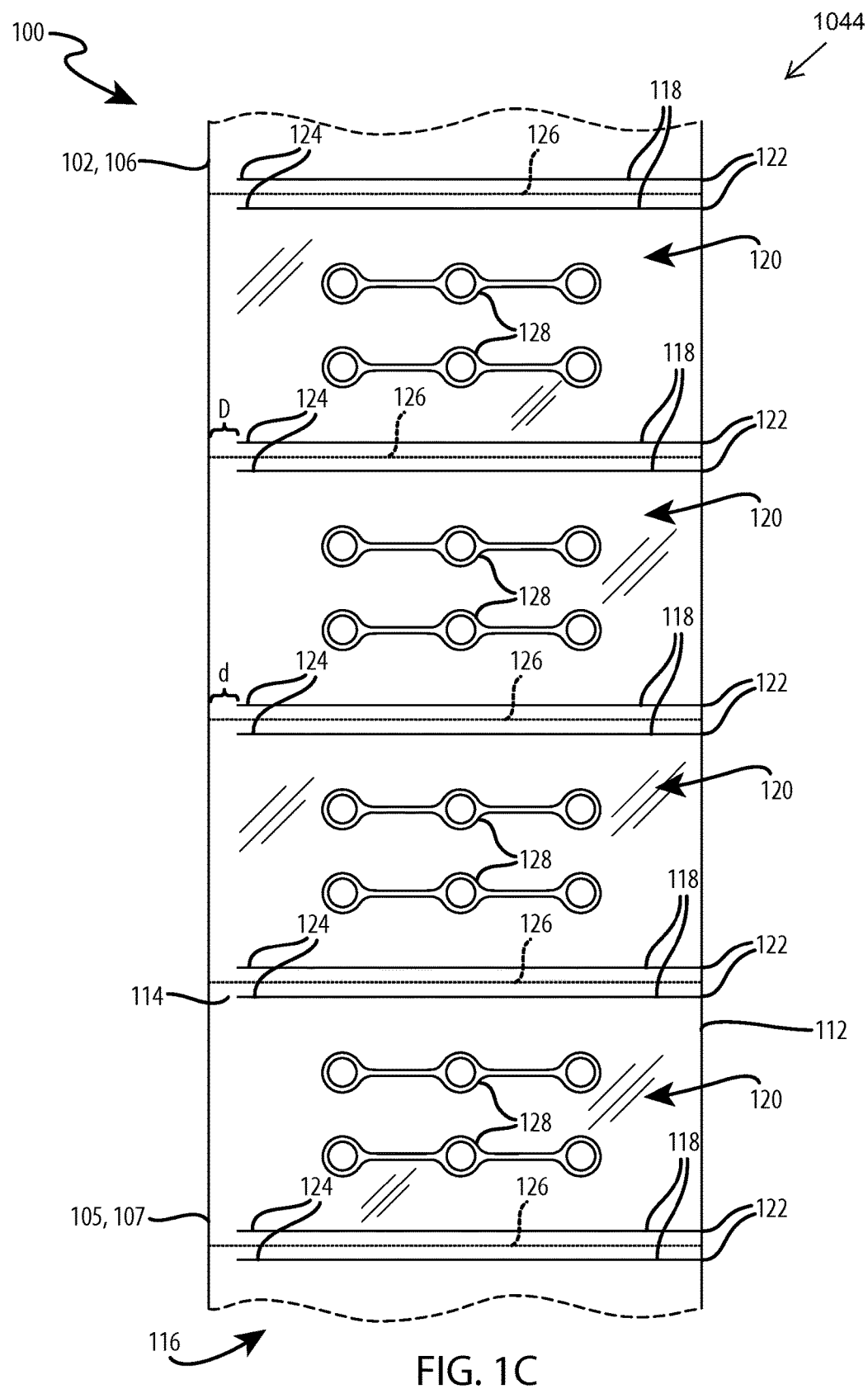

INFLATION AND SEALING DEVICE WITH INCLINED COMPONENTS

RELATED APPLICATIONS

The present application claims priority to U.S. Patent Application No. 61/944,026, filed Feb. 24, 2014, 61/944,515, filed Feb. 25, 2014, and 61/944,030, filed Feb. 24, 2014, the disclosures of which are incorporated herein by reference in their entireties.

TECHNICAL FIELD

The present disclosure is directed to devices and methods for manufacturing inflatable cushions to be used as packaging material.

BACKGROUND

A variety of inflated cushions are well-known and used for sundry packaging applications. For example, inflated cushions are often used as void-fill packaging in a manner similar to or in place of foam peanuts, crumpled paper, and similar products. Also for example, inflated cushions are often used as protective packaging in place of molded or extruded packaging components.

Generally, inflated cushions are formed from films having two layers or plies that are joined together by seals. The seals can be formed simultaneously with inflation, so as to capture air therein, or prior to inflation to define a film configuration having inflatable chambers. The inflatable chambers can be inflated with air or another gas or thereafter sealed to inhibit or prevent release of the air or gas.

Such film configurations can be stored in rolls or fan-folded boxes in which adjacent inflatable cushions are separated from each other by perforations. During use, a film configuration is inflated to form cushions and adjacent cushions or adjacent strands of cushions are separated from each other along the perforations.

A variety of film configurations are currently available. Many of these film configurations include seal configurations that tend to waste material, inhibit separation of adjacent inflated cushions, and/or form inflated cushions that are susceptible to under-inflation or leakage, thereby inhibiting utility.

The films are typically inflated by being pulled from a bulk quantity of the film and passed over or proximal to a nozzle. The nozzle blows air in between the films forming cushions. Heat is then used to bind two layers of the film together forming a seal which limits air from escaping. Frequently the films are poorly aligned or have too much freedom (e.g. slack) to be efficiently delivered to the nozzle for inflation. Additionally, due to the heat and pressures used in the process, the films may stick to machine surfaces or the film layers may be pulled apart while still hot and exiting the mechanism.

SUMMARY

In accordance with various embodiments, a web inflation device may include an inflation assembly configured for insertion between first and second overlapping film plies of a web of material the inflation assembly having a fluid conduit configured for directing a fluid in between the plies to inflate the web. The web inflation device may also include a support element that supports an uninflated portion of the web of material. The support element may be positioned adjacent to the inflation assembly such that the inflation assembly receives the web of material from the support element. The support element may have outwardly facing support portions positioned to contact and support an interior surface of a supply roll of the web. The support portions may be spaced circumferentially from each other with radially recessed areas there between. The radially recessed areas may form a cross section of the support element that is non-circular and is operable to reduce the contact surface between the support element and the interior surface of the roll.

In accordance with various embodiments, the support element may include three to five core support portions. The core support portions may be evenly or unevenly distributed circumferentially about the support element. The support portions may be curved along a phantom cylindrical surface defining the outer most circumference of the support element. Grip portions may extend radially away from the support portions to contact and provide increased friction between the support element and the supply roll.

In accordance with various embodiments, the support element may be triangular in axial cross-section. The support element may be a rotatable spindle. The support element may be axially connected to a brake that resists rotation of the support element. The brake may be a motor that controls rotation of the support element thereby controlling tension in the advancing web.

In accordance with various embodiments, the web inflation device may also include a guide element positioned adjacent to the support element such that as the material passes from the support element to the guide element the web of material undergoes a twist causing the web of material to have greater pressure against the guide element proximate to the connection between guide element and the mounting plate from which the guide element extends. The web inflation device may also include a plurality of film handling elements that have film supporting portions that support and direct an inflatable web of film in a longitudinal direction along a path. The handling elements may include a supply support element that supports a supply of the web in an uninflated state; an inflation mechanism operable to inflate the web with a fluid by directing the fluid between superimposed plies of the web; and a sealing mechanism operable to seal the plies together to seal the fluid therein. An angled two of the film supporting portions may extend in non-parallel directions transverse to the longitudinal direction to cause a difference in tautness in two portions of the web disposed transversely of each other in a same longitudinal location along the path. The transverse directions in which the two film supporting portions extend may be inclined with respect to each other measured rotationally about the longitudinal direction to cause the difference in tautness. The film handling elements include a guide member disposed along the path between the supply support and the inflation and sealing mechanisms. The angled supporting elements include the supply support and the guide member, such that the web travelling along the path is tauter on one transverse side of the handling element than the other.

In accordance with various embodiments, the support element may include a spindle that supports a web arranged in a roll, the spindle having a spindle axis. The guide member having a film contacting surface that contacts and guides the film to control the longitudinal direction of the path. The spindle axis and film contacting surfaces may be nonparallel in the transverse direction and inclined with respect to each other as measured about the longitudinal path. The inflation mechanism may include a nozzle extend-} ing longitudinally along the path for reception in an inflation channel between the plies. The guide member may be disposed between the supply support and the nozzle and inclined with respect to the spindle axis to increase tautness in the web upstream of the nozzle for smoothing the transition of the web onto the nozzle. The guide member may be positioned to produce a bend in the longitudinal direction of the path, the spindle axis being inclined with respect to the guide member contacting surface so that an end of the spindle that is transversely distal from the nozzle is oriented towards a convex side of the bend.

In accordance with various embodiments, a web inflation device may include a plurality of film handling elements that have film supporting portions that support and direct an inflatable web of film in a longitudinal direction along a path. The handling elements may include a supply support element that supports a supply of the web in an uninflated state; an inflation mechanism operable to inflate the web with a fluid by directing the fluid between superimposed plies of the web; and a guide member disposed along the path between the supply support and the inflation and sealing mechanisms. The sealing mechanism may be operable to seal the plies together to seal the fluid therein. The guide member may be positioned to produce a bend in the longitudinal direction of the path, the spindle axis being inclined with respect to a guide member contacting surface so that an end of the spindle that is transversely distal from the nozzle is oriented towards a convex side of the bend.

In accordance with various embodiments, the support element, the inflation assembly, and the sealing assembly may be positioned relative to one another such that their position relative to one another along with contact between the flexible structure and each of the points along each of the support element, the inflation assembly, and the sealing assembly defines a path traversed by the web. The path may include a plurality of direction changes for the web with each direction change characterized by a plurality of curves that describes the direction change of the flexible structure and a transversely extending central axis defined by geometry of each of the curves. At least one or more of the central axis may include a non-parallel direction with respect to the support element. The angle between the guide element and the support element may be from about 10° to about 45°. The support element may be a rotatable spindle. The support element may be axially connected to a brake that resists rotation of the support element. The brake may be a motor that controls rotation of the support element thereby controlling tension in the advancing web.

BRIEF DESCRIPTION OF THE DRAWINGS

FIGS. 1A-D are schematics of various embodiments of flexible structures as used in conjunction with an inflation and sealing device;

DETAILED DESCRIPTION

Figure 1A:
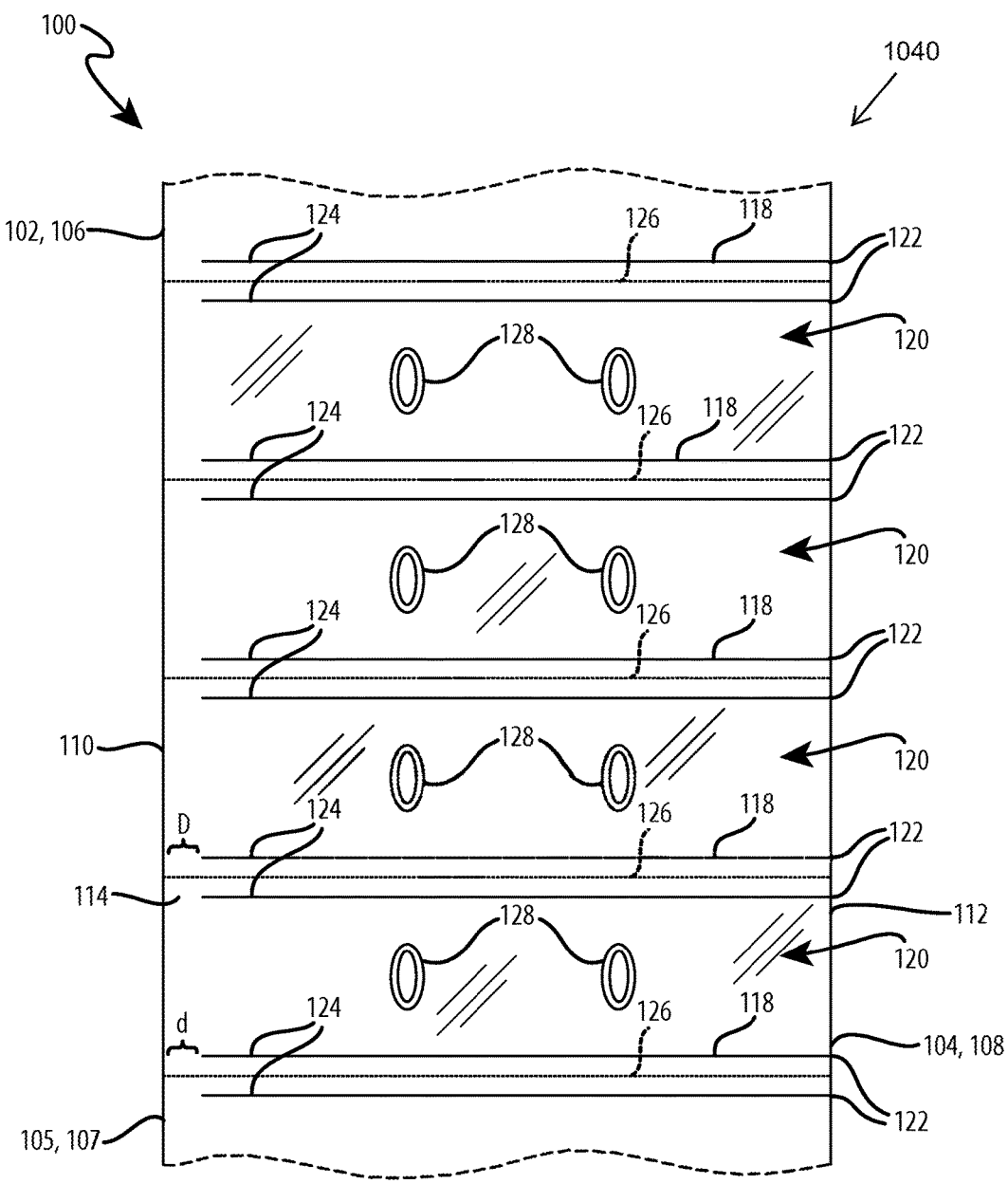
Figure 1B:
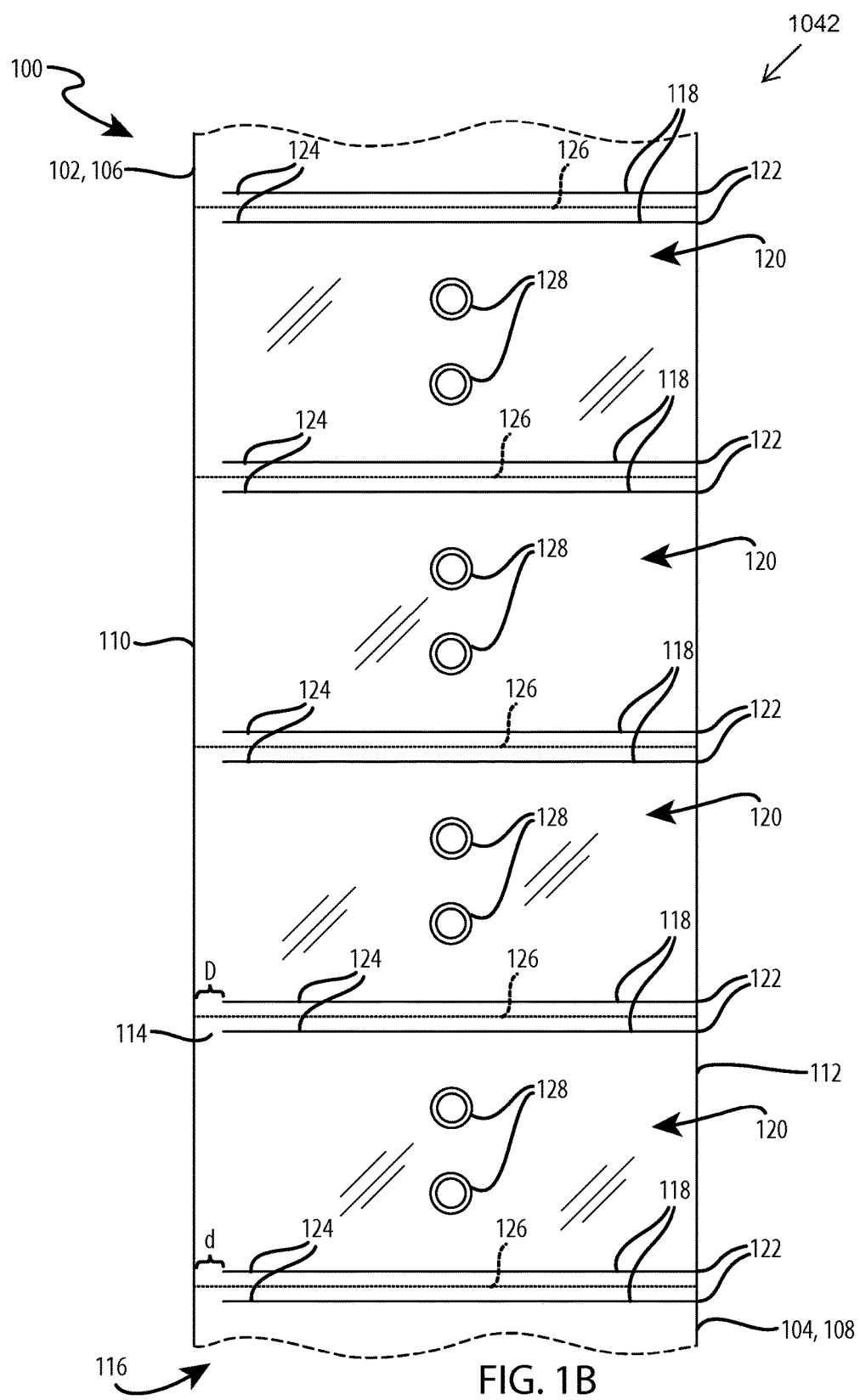
Figure 1D:
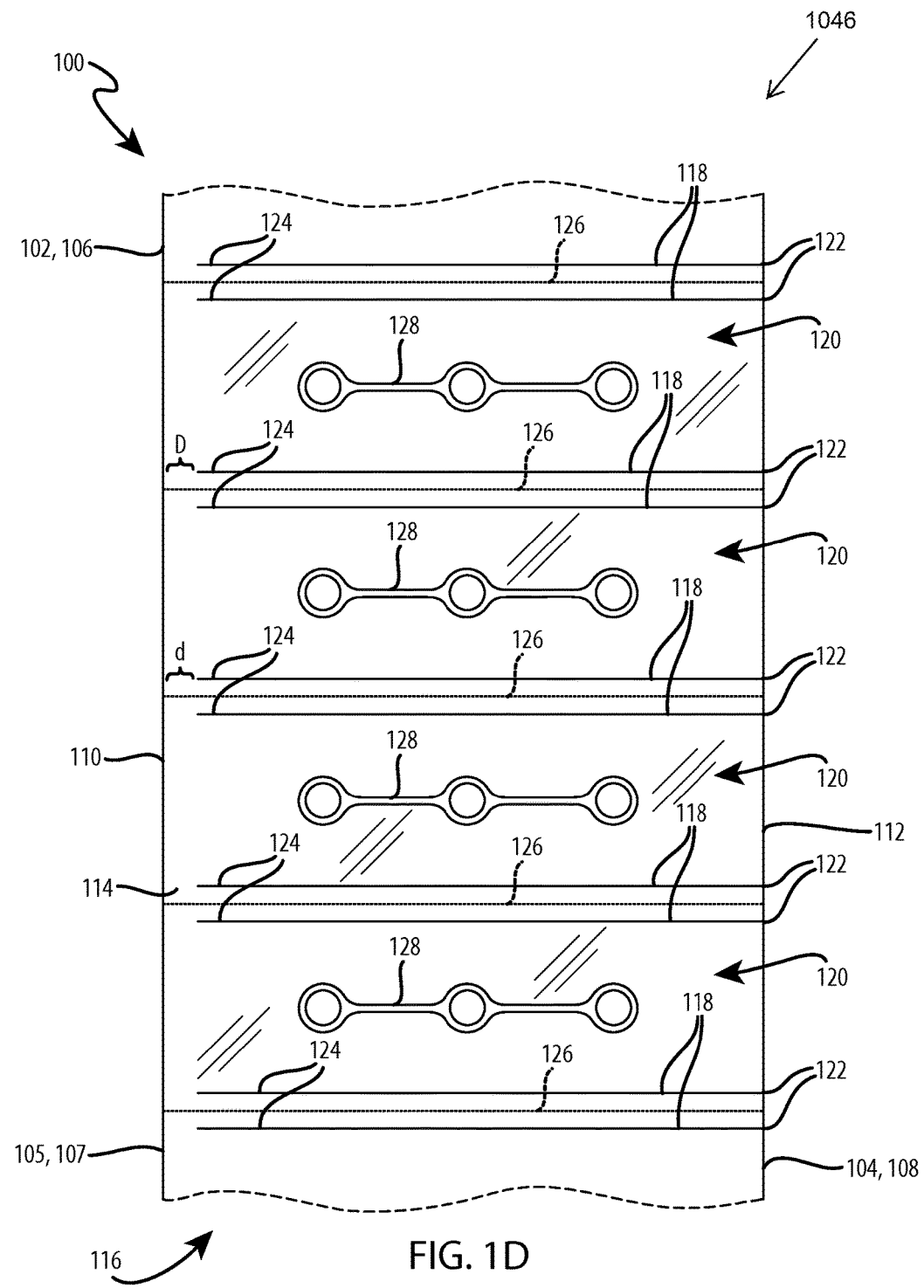

The present disclosure is related to systems and methods for converting uninflated material into inflated cushions that may be used as cushioning or protection for packaging and shipping goods. Specifically, mechanisms prior to sealing and inflation and mechanisms post-sealing and inflation may improve the overall efficiency and speed of the process of forming the cushions. Prior to sealing and inflation, the system may include a material support element which better stores, controls, and delivers the material to the sealing and inflation mechanisms. After the sealing and inflation of the material, material control elements may better direct the material out of the system without damaging the seal or failing to release the heater material from the contact surfaces.

Illustrative embodiments will now be described to provide an overall understanding of the disclosed apparatus. Those of ordinary skill in the art will understand that the disclosed apparatus can be adapted and modified to provide alternative embodiments of the apparatus for other applications, and that other additions and modifications can be made to the disclosed apparatus without departing from the scope of the present disclosure. For example, features of the illustrative embodiments can be combined, separated, interchanged, and/or rearranged to generate other embodiments. Such modifications and variations are intended to be included within the scope of the present disclosure.

Each of the embodiments, examples, aspects, representations, and illustrations of subject matter discussed herein may incorporate the embodiments, examples, aspects, representations, and illustrations as disclosed, for example in U.S. application Ser. No. 13/844,741. Similarly, the subject matter discussed herein may also be incorporated into the various system disclosed in the incorporated references. Embodiments are not meant to stand alone, but may be combined with other embodiments from the other referenced applications or various other embodiments disclosed herein. For example, the incorporated references variously describe inflation mechanisms (e.g. the variously structured nozzles, cutting devices, and air blowers) and sealing mechanisms (e.g. the variously disclosed sealing drums), each of which may be used herein as the inflation and sealing device utilized to process the web and form the resultant cushions.

FIGS. 1A-1D illustrates schematics of various embodiments of flexible structures. The flexible structure may be formed in a variety of manners such as flexible structure 1040 in shown in FIG. 1A, flexible structure 1042 shown in FIG. 1B, flexible structure 1044 shown in FIG. 1C, or flexible structure 1046 shown in FIG. 1D. The flexible structure, such as a multi-layer/ply web 100 of film, for inflatable cushions is provided. The web includes a first film layer 105 having a first longitudinal edge 102 and a second longitudinal edge 104, and a second film layer 107 having a first longitudinal edge 106 and a second longitudinal edge 108. The second web layer 107 is aligned to be over lapping and can be generally coextensive with the first web layer 105 (as shown in FIGS. 1A-1D), i.e., at least respective first longitudinal edges 102,106 are aligned with each other and/or second longitudinal edges 104,108 are aligned with each other. In some embodiments, the layers can be partially overlapping with inflatable areas in the region of overlap. The layers may be joined to define a first longitudinal edge 110 and a second longitudinal edge 112 of the film 100. The first and second web layers 105,107 can be formed from a single sheet of web material, a flattened tube of web material with one edge slit, or two sheets of web material. For example, the first and second web layers 105,107 can include a single sheet of web material that is folded to define the joined second edges 104,108 (e.g., "c-fold film"). Alternatively, for example, the first and second web layers 105,107 can include a tube of web material (e.g., a flatten tube) that is slit along the aligned first longitudinal edges 102,106. Also, for example, the first and second web layers 105,107 can include two independent sheets of web material joined, sealed, or otherwise attached together along the aligned second edges 104, 108.

The web 100 can be formed from any of a variety of web materials known to those of ordinary skill in the art. Such web materials include, but are not limited to, ethylene vinyl acetates (EVAs), metallocenes, polyethylene resins such as low density polyethylene (LDPE), linear low density polyethylene (LLDPE), and high density polyethylene (HDPE), and blends thereof. Other materials and constructions can be used. The disclosed web 100 can be rolled on a hollow tube, a solid core, or folded in a fan folded box, or in another desired form for storage and shipment.

As shown in FIGS. 1A-D, the web 100 can include a series of transverse seals 118 disposed along the longitudinal extent of the web 100. Each transverse seal 118 extends from the longitudinal edge 112 towards the inflation channel 114, and in the embodiment shown, toward the first longitudinal edge 110. Each transverse seal 118 has a first end 122 proximate the second longitudinal edge 112 and a second end 124 spaced a transverse dimension d from the first longitudinal edge 110 of the film 110. A chamber 120 is defined within a boundary formed by the longitudinal seal 112 and pair of adjacent transverse seals 118.

Each transverse seal 118 embodied in FIGS. 1A-D is substantially straight and extends substantially perpendicular to the second longitudinal edge 112. It is appreciated, however, that other arrangements of the transverse seals 118 are also possible. For example, in some embodiments, the transverse seals 118 have undulating or zigzag patterns.

The transverse seals 118 as well as the sealed longitudinal edges 110,112 can be formed from any of a variety of techniques known to those of ordinary skill in the art. Such techniques include, but are not limited to, adhesion, friction, welding, fusion, heat sealing, laser sealing, and ultrasonic welding. An inflation region, such as a closed passageway, which can be a longitudinal inflation channel 114, can be provided. The longitudinal inflation channel 114, as shown in FIGS. 1A-D, is disposed between the second end 124 of the transverse seals 118 and the first longitudinal edge 110 of the film. Preferably, the longitudinal inflation channel 114 extends longitudinally along the longitudinal side 110 and an inflation opening 116 is disposed on at least one end of the longitudinal inflation channel 114. The longitudinal inflation channel 114 has a transverse width D. In the preferred embodiment, the transverse width D is substantially the same distance as the transverse dimension d between the longitudinal edge 110 and second ends 124. It is appreciated, however, that in other configurations other suitable transverse width D sizes can be used.

The second longitudinal edge 112 and transverse seals 118 cooperatively define boundaries of inflatable chambers 120.

In one preferred embodiment, the inflatable chambers 120 may further include intermediate seals 128. The intermediate seals 128 may seal the 105, 107 to one another at intermediate areas in the chamber 120. As shown in FIGS. 1A-D, opposing intermediate seals 128 are transversely aligned across the chamber 120. The intermediate seals 128 create bendable lines that allow for a more flexible web 100 that can be easily bent or folded. Such flexibility allows for the film 100 to wrap around regular and irregular shaped objects.

Figure 1E:
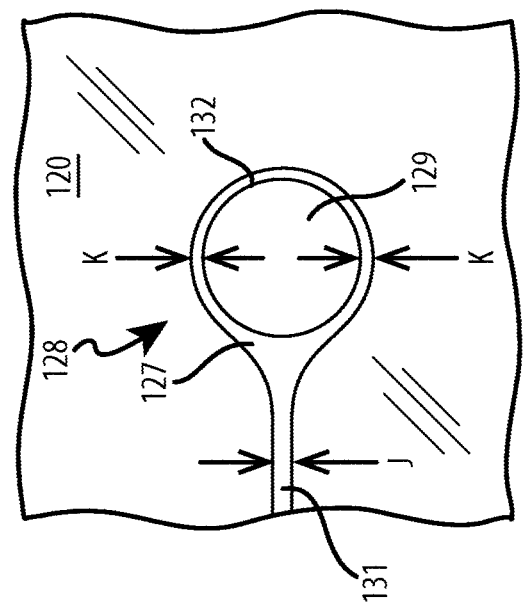
FIG. 1E is a partial view showing an intermediate seal of FIG. 1C shown along view II-II.
Figure 1E:
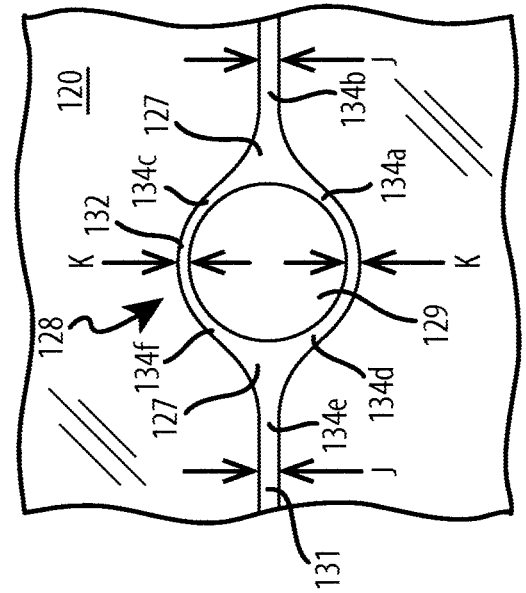

As illustrated in FIG. 1E which is a partial view of FIG. 1C shown along view II-II. In accordance with various embodiments, such as the one illustrated in FIG. 1E, the intermediate seal 128 may include a partial seal 131. The partial seal 131 may extend transversely across chamber 120. The partial seal 131 may extend longitudinally or in any other direction across the chamber 120 as well in or in the alternative. The partial seal 131 may broaden to define seal section 129 which may also be an inner portion. Seal section 129 may have a larger area with respect to the area of partial seal 131. The larger partial seal 131 may reduce the thickness of the web 100 when inflated. By narrowing partial seal 131 the thickness of web 100 may increase until the area of the partial seal 131 and the seal section 129 are the same then the thickness of web 100 may not be different at around the area of seal section 129. The seal section 129 may be a seal wherein the layers 105,107 are attached to one another. The seal section 129 may be a section where narrow seals such as a continuation of seal 131 define the seal section 129. The seal section 129 may be an area where a seal such as partial seal 131 encloses a section of unattached layers 105, 107. A solid seal across seal section 129 (i.e. where the layers 105, 107 are attached) may form a stiffer section of the web 100. A non-solid seal across seal section 129 (i.e. where the layers 105, 107 are unattached) may be a more flexible web 100. In order to enclose seal section 129 the partial seal 131 may have include a transition. The transition in one example may form a gusset 127. The gusset may have a width that is wider than the seal portion 129. For example the seal portion 129 may have a width of J. The gusset 127 may widen from width J to 1½ times wider to 10 times wider. For example the gusset 127 may be 5 times wider. The gusset may then narrow again to width K above and below the transition area. Or the gusset 127 may widen to the entire width of the transition area and then narrow back to width J as the partial seal 131 continues. The gusset 127 may be concave as viewed from the chamber 120. This may allow the transition to be gradual or not sharp. The gradual transition may reduce stresses at the seal section 129. A sharp transition would be a stress riser such as if the seal section 129 and the seal portion 131 was 90° angle. In accordance with various embodiments seal section 129 may be circular, oval, triangular, or any other shape. As shown in FIG. 1E the seal section 129 may be a circle.

A series of lines of weaknesses 126 is disposed along the longitudinal extent of the film and extends transversely across the first and second web layers of the film 100. Each transverse line of weakness 126 extends from the second longitudinal edge 112 and towards the first longitudinal edge 110. Each transverse line of weakness 126 in the web 100 is disposed between a pair of adjacent chambers 120. Preferably, each line of weakness 126 is disposed between two adjacent transverse seals 118 and between two adjacent chambers 120, as depicted in FIGS. 1A-D. The transverse lines of weakness 126 facilitate separation of adjacent inflatable cushions 120.

The transverse lines of weakness 126 can include a variety of lines of weakness known by those of ordinary skill in the art. For example, in some embodiments, the transverse lines of weakness 126 include rows of perforations, in which a row of perforations includes alternating lands and slits spaced along the transverse extent of the row. The lands and slits can occur at regular or irregular intervals along the transverse extent of the row. Alternatively, for example, in some embodiments, the transverse lines of weakness 126 include score lines or the like formed in the web material.

The transverse lines of weakness 126 can be formed from a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second web layers, such as electro-magnetic (e.g., laser) scoring and mechanical scoring).

Figure 2:
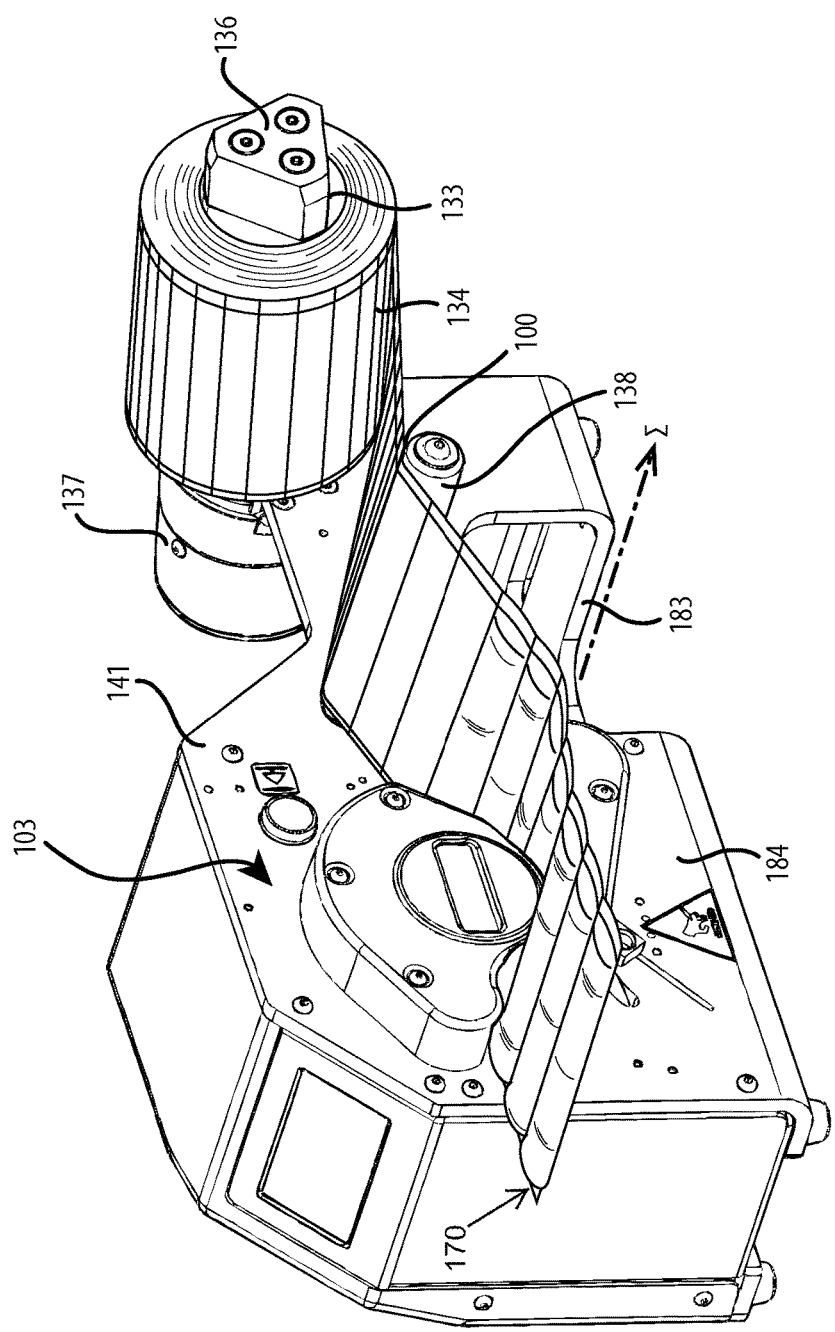
FIG. 2 is perspective view of an inflation and sealing device in accordance with various embodiments.
Figure 3:
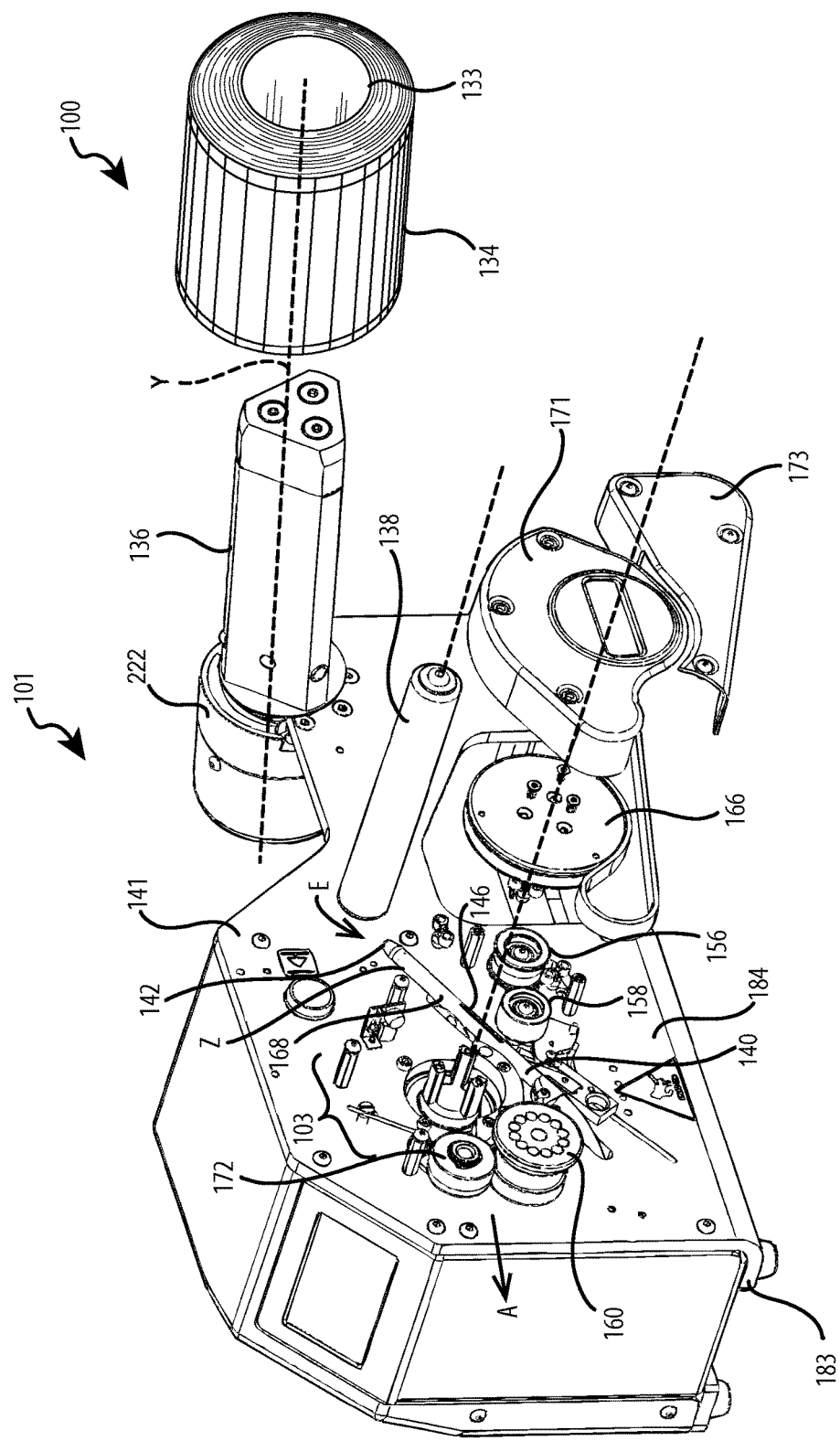
FIG. 3 is a perspective, exploded view thereof.

Turning now to FIG. 2, an inflation and sealing device 101 for converting a flexible structure such as web 100 of uninflated material into a series of inflated pillows or cushions 120 is provided. As shown in FIG. 2, the uninflated web 100 can be a bulk quantity of supply, uninflated material. For example, the bulk quantity of uninflated material may be a roll of the material 134 as illustrated in FIGS. 2 and 3. The web 100 may be rolled around an inner support tube 133.

In accordance with various embodiments, sealing device 101 may include handling elements, with each of the handling elements including film supporting portions. The support portions may support and direct an inflatable web of film in a longitudinal direction along a path. The handling elements may include a supply support element 136 that supports a supply 134 of the web 100 in an uninflated state. An inflation mechanism may be operable to inflate the web with a fluid by directing the fluid between superimposed plies 105, 107 of the web 100. A sealing mechanism may be operable to seal the plies 105, 107 together to seal the fluid therein. Two of the film supporting portions may be angled and extend in non-parallel directions with respect to one another and transverse to the longitudinal direction. The position of the two film supporting portions may cause a difference in tautness in two portions of the web disposed transversely of each other in a same longitudinal location along the path.

Figure 4:
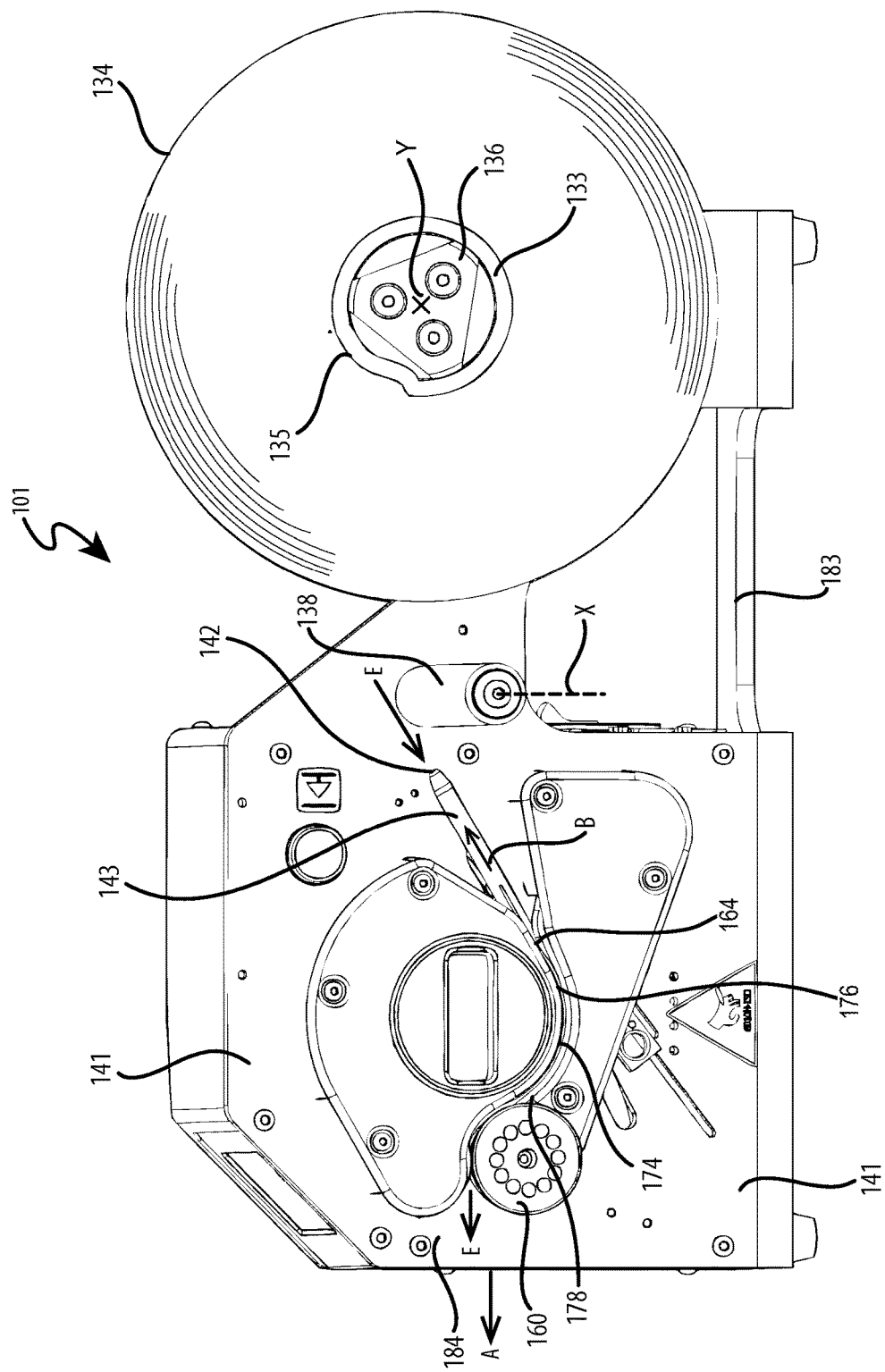
FIG. 4 is a top, right-side view as seen along axis Y of a material support thereof.

The inflation and sealing device 101 may include a bulk material support 136. The bulk quantity of uninflated material may be supported by the bulk material support 136. For example, the bulk material support may be a tray operable to hold the uninflated material, which tray can be provided by a fixed surface or a plurality of rollers for example. To hold a roll of material the tray may be concave around the roll or the tray may be convex with the roll suspended over the tray. The bulk material support may include multiple rollers which suspend the web. The bulk material support may include a single roller that accommodates the center of the roll of web material 134. As illustrated in FIGS. 2-4, the roll of the material 134 may be suspended over the bulk material support 136, such as a spindle passing through the core 133 of the roll of the material 134. Typically, the roll core is made of cardboard or other suitable materials. The material support 136 may rotate about an axis Y.

The web 100 may be suspended over a guide 138 after being pulled off of the supply of uninflated material (e.g., roll 134). The guide may provide support to the web 100 upon a transition from the bulk quantity of uninflated material to the sealing and inflation mechanism 103 discussed in more detail below. The guide may be a stationary rod extending from a support member 141. As shown in FIGS. 2-4, the guide 138 may be a roller that which extends from the support member 141. The guide 138 may have an axis X around which the guide 138 rotates. The guide 138 or the axis X may extend generally perpendicularly from the support member 141. The guide 138 directs the web 100 away from the bulk quantity of uninflated material (e.g. roll 134) and steadily along a material path "B" along which the material is processed in a longitudinal direction "A". As the bulk quantity of uninflated material may change position or dimension as the web 100 is continuously pulled from it (e.g. the roll 134 may decrease in diameter as material is pulled off), the guide may maintain alignment with the sealing and inflation mechanism despite these changes, and preferably with the upstream end of inflation tip 142. The guide 138 can be configured to limit the material 134 from sagging between the inflation nozzle 140 and roll 134, and can help maintain any desired tension in the web 100 of the material.

In accordance with various embodiments, the inflation and sealing device 101 may include a support member 141. The support member 141 may include a base member (e.g., a horizontal plate 183) and a vertical member (e.g., vertical plate 184). The vertical member may locate the inflation and sealing assembly 103, guide 138, and material support 136 relative to one another. The vertical member may be a flat wall. In various embodiments, the vertical member may have a verity of shapes that may extend in various directions. The vertical member (e.g., vertical plate 184) may be a single component which 103, 138 and 136 all attach to. In this manner the various components the inflation and sealing assembly 103, guide 138, and material support 136 may have tolerances relative to one another based on the tolerances in the formation of the single component. This may very accurately locate the components relative to one another. Additionally the vertical member (e.g., vertical plate 184) and the base member (e.g., horizontal plate 183) may be a single component. For example, a bent piece of steel may form the vertical member the base member.

In accordance with various embodiments, the material support 136 may extend from the support member 141 at an angle different than the angle from which guide 138 extends from the support member 141. As indicated above, guide 138 may extend from the support member 141 generally perpendicularly, whereas the material support 136 may extend from the support member 141 non-perpendicularly. In other embodiments, neither the guide 138 nor the material support 136 may extend from the support member 141 perpendicularly.

Figure 5:
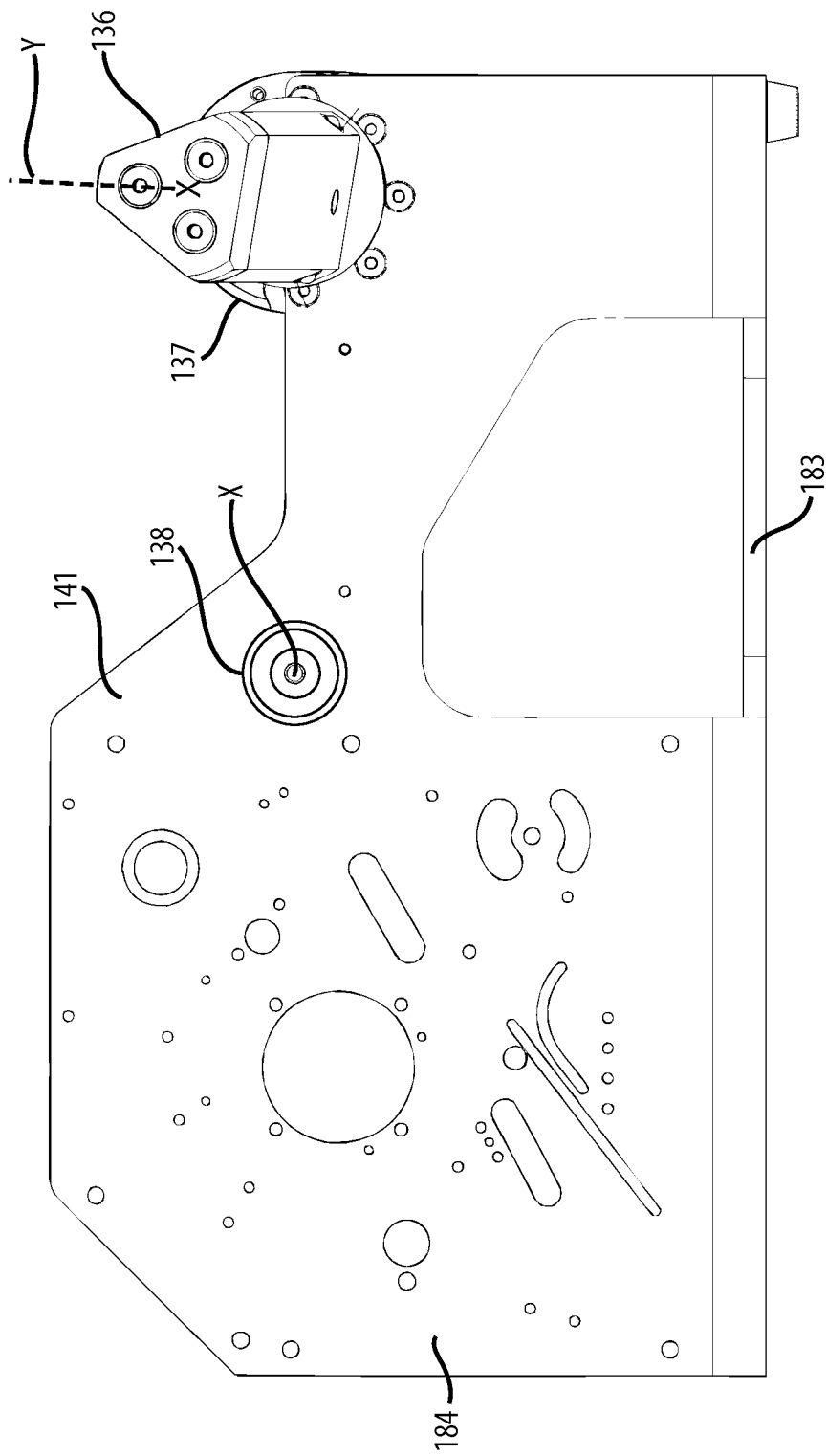
FIG. 5 is a right-side view of a partially assembled system thereof.

FIG. 4 illustrates a view of the inflation and sealing device 101 along axis Y. As shown here, the material support 136 is shown on its end, but the length of the guide 138 is shown in an isometric view illustrating an angular difference between the two. Notably here, the axis Y extends up compared to axis X. FIG. 5 illustrates a front view showing the end of guide 138 but a bottom isometric view of material support 136. Again, the axis Y extends up compared to axis X. In accordance with various embodiments, axes Y and X may be skew axes (i.e. the axes may be neither parallel nor intersecting). The relative position of these axes indicates the relative position of the material support 136 and the guide 138. In accordance with embodiments discussed herein, the material support 136 and the guide 138 may rotate around axes Y and X respectively. The axis X may be perpendicular to the support member 141 with Y being non-perpendicular to the support member 141.

Figure 6:
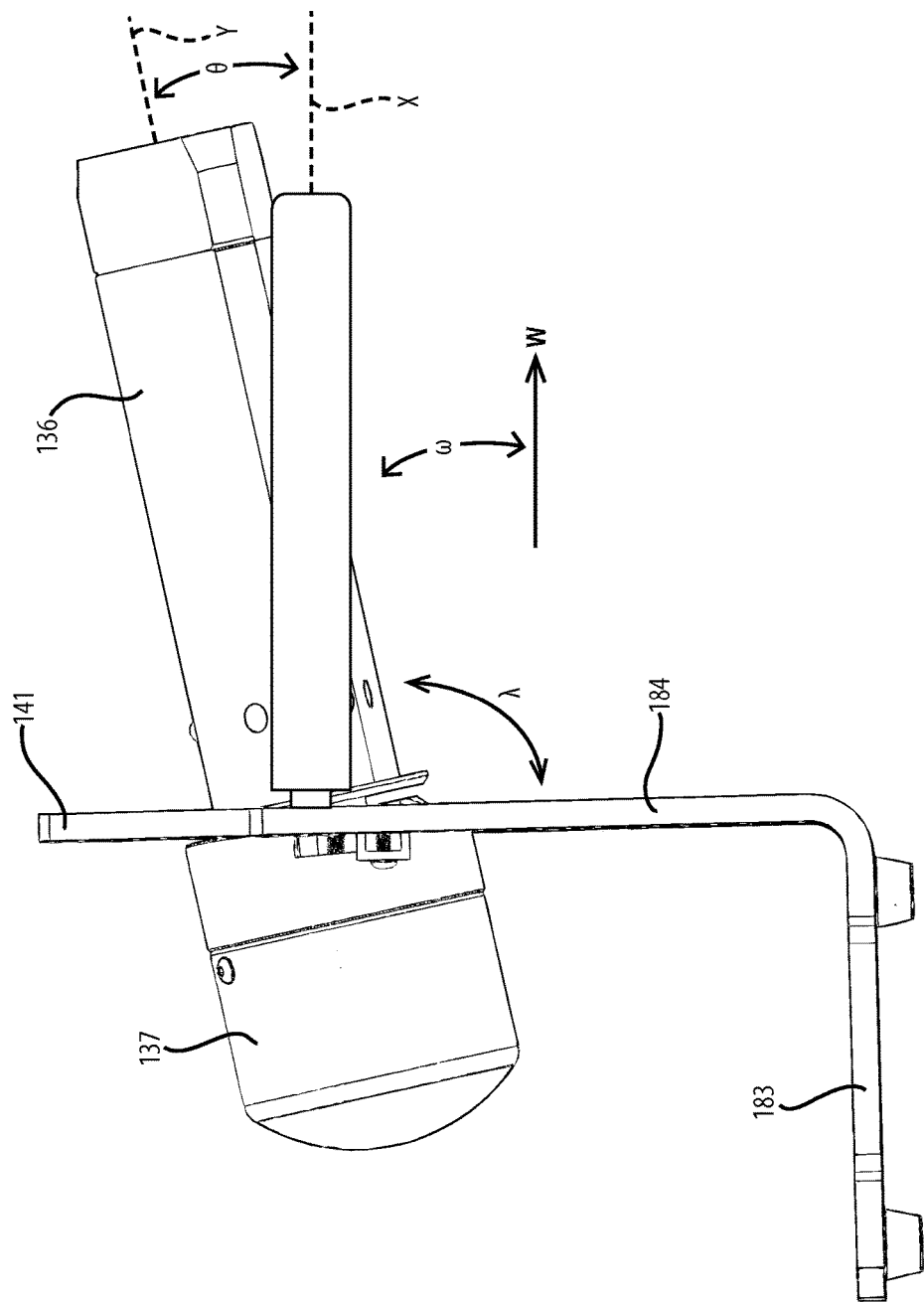
FIG. 6 is a front view of the partially assembled device of FIG. 5.

As illustrated in FIG. 6, axis Y or the material support 136 may be positioned at an angle λ relative to the front wall 139 of the support member 141. The angle λ may be other than 90°. For example, λ, may be 70° to 140°. In one example, λ may be about 100°. However, the material support 136 and the guide 138 may be attached to different surfaces or at different angles, such as both pointed upwards with respect to the front wall 139 or both pointed downwards with respect to the front wall. As viewed from the side (e.g. FIG. 6), the angle between axis X and axis Y may be Θ. Θ may be measured rotationally about the longitudinal path of the web 100. As shown axis X and axis Y extend transversely from the longitudinal path with a rotational variance about that path. This same system of measurement may be used with respect to other components as well (e.g. axis W). Θ may be an angle between the axes that ranges from about 5° to about 70°. Θ may be an angle between the axes that ranges from about 10° to about 45°. In accordance with various embodiments, the web 100 may travel through the inflation and sealing device 101 along path E. As illustrated in FIGS. 3 and 4, the film path E extends along the nozzle 140. An axis Z is located where the film path E follows the nozzle 140. In accordance with various embodiments, the direction that nozzle 140 points is the same direction axis Y points. For example if nozzle 140 points up (e.g. away from the horizontal plate 183) then axis Y points up. If nozzle 140 points down (e.g. toward the horizontal plate 183) then axis Y points down. In accordance with various embodiments, the path may include a plurality of direction changes for the flexible structure 100 with each direction change characterized by a plurality of curves that describes the direction change of the flexible structure and a transversely extending central axis defined by geometry of each of the curves. In some embodiments, the path may be generally straight having no or few direction changes for flexible structure 100 through the device.

In various embodiments, the web 100 may pass above the guide 138. In such embodiments, the material support 136 and axis Y may be angled with respect to guide 138 such that the material support 136 and axis Y point in the same direction as the web 100 passes over guide 138. If web 100 passes over guide 138 then the material support 136 may point up relative to the guide 138. If web 100 passes under then guide 138, then the material support 136 may point down relative to guide 138.

In accordance with various embodiments, the web 100 passes through the inflation and sealing assembly 103 and extends away from the inflation and sealing device 101 in a transverse direction which is perpendicular to longitudinal direction A in which the web 100 exits the inflation and sealing device 101. An axis W may be aligned at the pinch area 176 and extend in the transverse direction away from the inflation and sealing device 101. The angle ω between the axis W and the axis Y may be an angle between the ranges from about 5° to about 70°. The angle ω between W and the axis Y may be an angle between about 10° to about 45°. The angle may be viewed in the longitudinal direction such as from the front of the inflation and sealing device 101 such as shown in FIG. 6.

In some embodiments axes Y and X may be parallel, for example both extending though the support member 141 perpendicularly, both may extend downwardly, or both may extend upwardly. As indicated above Y and X may be non-parallel with both extending downwardly, or both extending upwardly.

The angled supporting elements (e.g. guide 138, material support 136, sealing mechanism or other element) may be positioned relative to one another such that the web travelling along the path is tauter on one transverse side of the handling element than the other. For example, when the web 100 is removed from the material support 136 and is positioned at an angle different from the guide 138, the web 100 includes a slight twist as it is removed from the bulk quantity of uninflated material (e.g. roll 134) and re-aligned over and in contact with guide 138. The web 100 may roll off of material support 136 tangentially and thereby form a plane (or a surface that approximates a plane tangential with the surface of the roll 134) that is parallel with the axis of material support 136. The web 100 may also engage guide 138 tangentially forming a different plane (or approximating a different plane tangent with the guide 138). The web may merely reflect tangential planes as if it maintained tangential contact with the material support 136 or guide 138 even if in practice there is tension on one transverse end of the web 100 and slack on the other transverse end of the web 100. In order to accommodate both tangential contacts the web 100 may realign or twist slightly between the material support 136 and guide 138. This realignment of the web 100 may cause this slight twist which may affect the way that the web 100 contacts guide 138. In embodiments wherein angle λ, is greater than 90°, the slight twist causes the web 100 to have greater pressure against the guide 138 proximate to the connection between guide 138 and the support member 141. The web 100 may have lesser pressure and less tension on the end of guide 138 that is distal to the connection between guide 138 and the support member 141. This configuration of contact between web 100 and guide 138 aids in maintaining alignment of the web toward the sealing mechanism and limiting the tendency of the web 100 to drift off the end of guide 138 that is distal of the support member 141.

On a related note, the end of the material support 136 can have a tendency to sag under weight, such as under the weight of a roll of material 134 being mounted thereon. As such, in response to the material support 136 being structured extending perpendicularly from the support member 141, the material support 136 and or axis Y tends to deflect downwardly when the roll of material 134 is mounted thereon. In this position the opposite effect to the one discussed above occurs. The web 100 may contact the guide 138 with greater pressure on the end of the guide 138 that is distal to the support member 141. Conversely, the side of the guide 138 that is proximate to the support member 141 may have less pressure between the guide 138 and the web 100 as compared to the distal end of guide 138. In this way, web 100 may tend to drift off the guide 138, become un-aligned with the sealing and inflation mechanism, or acquire slack between the roll of material 134 and the sealing and inflation mechanism. Thus, by structuring the material support 136 with an angle greater than the guide 138 as measured upwardly from the support member 141 (e.g. see FIG. 6) the sag in the material support 136 and the tension issues with the guide 138 may be overcome, thereby improving the intake of web 100 into the sealing and inflation mechanism.

In accordance with various embodiments, the nozzle 140 may inflate web 100 not only at a transverse edge but may engage an inflation channel located at any transverse distance between the longitudinal edges; i.e., the inflation and sealing device 101 fills a central channel with chambers on both transverse sides of the inflation channel. The web 100 may roll off of material support 136 and over guide 138 in a manner that aligns such a central inflation channel with the nozzle 140.

As discussed above, in various embodiments the material support 136 may include a spindle 200. The spindle 200 may be axially aligned along axis Y with a motor 220. The motor 220 and the spindle 200 may be attached via a bulkhead connector 222. The bulk head connector 222 may have a mounting surface 223. The mounting surface may attach to the backside of the support member 141 such that the motor 220 may be positioned on one side and the spindle 200 may be positioned on the other side as illustrated in FIG. 6. The mounting surface 223 may form an angle with axis Y such that axis Y is not perpendicular thereto. For example, FIG. 6 shows mounting surface 223 as parallel with vertical plate 184. As such, $\lambda$, represents the angle between mounting surface 223 and Y. Instead, the mounting surface 223 may be angled such that as it attaches to the back side of the support member 141, it tilts the spindle 200 and motor 220 relative to the support member 141. An example of this structure is shown in FIG. 6 with the angle $\lambda$, which may also represent the angle between mounting surface 223 and the axis Y. Spindle 200 may be supported within the bulk head connector 222 by bearings 214 and 224. The bearings 214,224 may allow the spindle 200 to be rotatable independent of the bulkhead connector 222 and ultimately the support member 141, to which the bulkhead connector 222 attaches. In various embodiments, the spindle may be supported on a shaft, surface bearings, or by the motor directly. The spindle 200 may be locked into place on the bulk head 222 with clip 226. Cover 228 and bulk head connector 222 may form an enclosure around motor 220.

The spindle 200 may include two sections, a body portion 202 and a tip portion 204. The body portion 202 and the tip portion 204 may be formed of different materials. 6. The spindle 200 preferably has core support portions 206, which are outwardly facing surfaces spaced circumferentially about axis Y from each other to provide radially recessed areas 208 there between. The core support portions 206 protrude radially from the axis Y higher than the surfaces of the spindle 200 in the radially recessed areas 208. The core support portions can collectively define and be positioned along a phantom cylindrical surface that will correspond closely to the interior, hollow, surface within a supply roll 134. If other shaped cores are to be used, the core support portions can be arranged in other shapes. The core support portions 206 can be curved circumferentially along this phantom cylindrical surface or can be flat or have other shapes. The recessed areas 208 are positioned radially inward of the phantom cylinder, so that they entirely or in large part do not contact the interior of a supply roll mounted on the spindle 200. The recessed areas 208 have substantially flat surfaces in the embodiment shown, but other configurations can be used.

In accordance with various embodiments, the support element (e.g. spindle 200) may include a major radius and minor radius. The major radius may be the outer most structural portion of the support element. The minor radius may be the smallest radius of the recessed areas 208. The minor radius at a center point between core support portions may depend upon the length of the circumferential portion of the core support portions, the number of support portions, and the shape of the recessed areas. In one example the minor radius may be ½ of the major radius of the core support portions (e.g. assuming an equilateral triangle with core support portions having negligible length and the recessed area having a flat surface shape.) In other examples, the minor radius may be less than ½ of the major radius providing additional clearance for insertion into a deformed supply roll. In other examples, the minor radius may greater than ½ of the major radius providing additional strength for supporting the supply roll. The core support portions may have a sufficient circumferential length so as to not cut into the roll core but instead support the roll core while also being usable with a roll core having collapsed portions. Each of the core support portions 206 may form a contiguous part of the outer surface of the support element (e.g. spindle 200) gripping elements 210 may extend from the out surface.

In accordance with various embodiments, the core support portions 206 may be the largest radius of the support element (e.g. spindle 200). The core support portions may be separated by the recessed features such that core support portions 206 occur every 10-120° around the axis of the support element (e.g. spindle 200). For example, with a triangle cross section of the support element (e.g. spindle 200) the core support portions 206 may be located every 120°.

Figure 7:
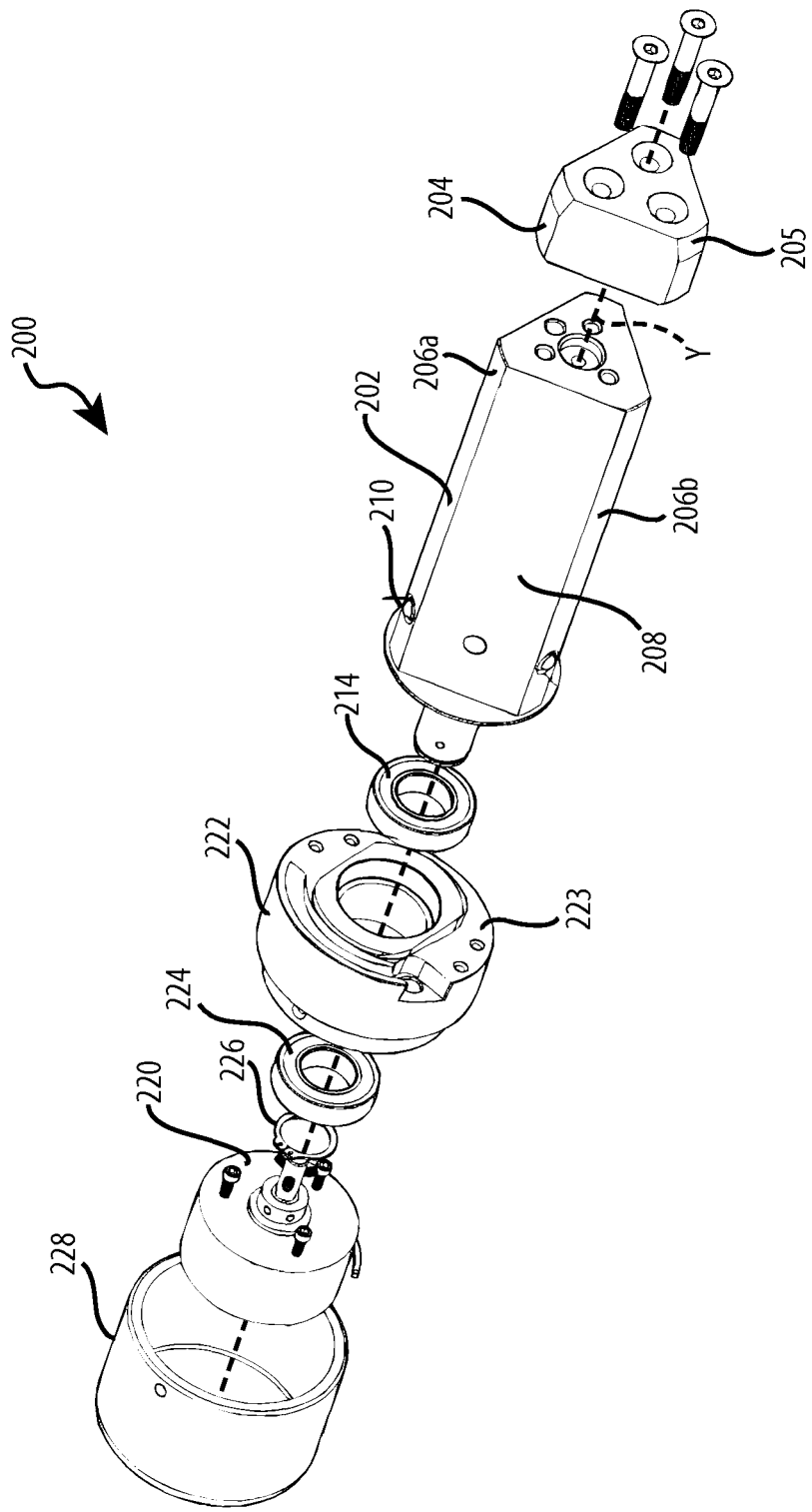
FIG. 7 is a perspective, exploded view of a material support and brake of the device of FIG. 2.
Figure 8:
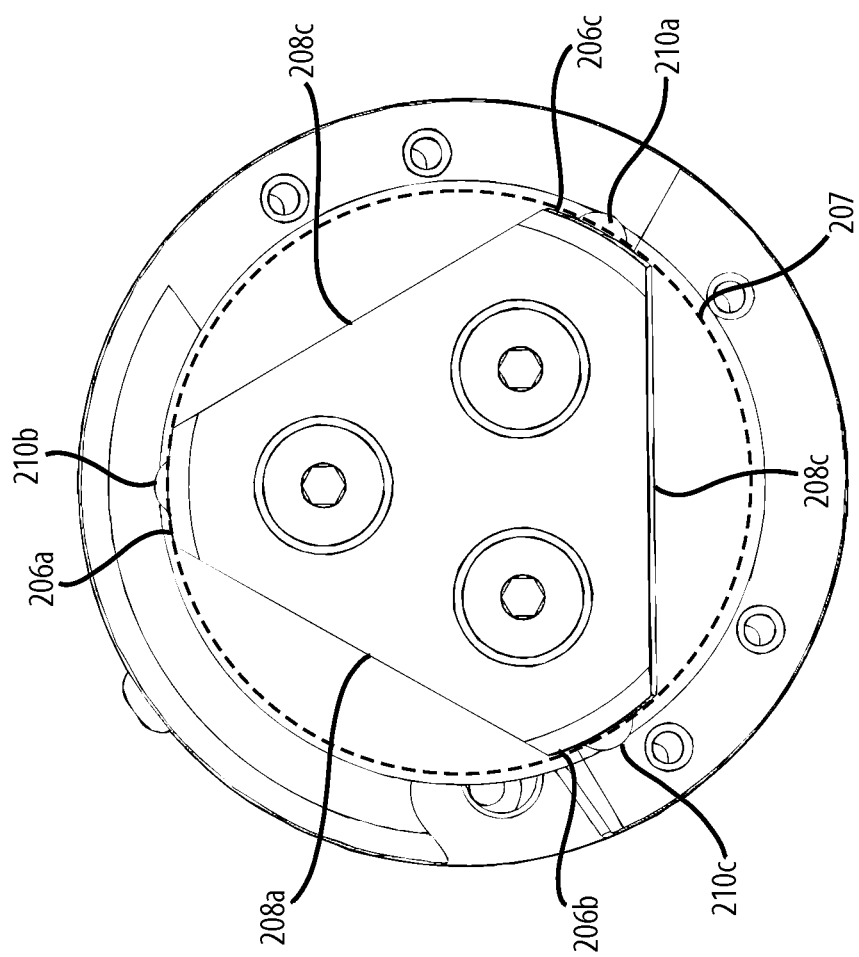
FIG. 8 is a right-side view of the material support and brake of the device of FIG. 2.

In the embodiment of FIG. 7, the recessed areas 208 lie below the phantom cylinder 207, and the core support portions 206 generally follow the phantom cylinder 207, although other shapes can be used. In this manner, the spindle 200 may be generally triangular in shape having three core support portions 206, but can alternatively have four, five, or more core support surfaces, and the core support portions can be evenly or unevenly distributed circumferentially about the spindle. In one example, as shown in FIG. 8 viewed down the Y axis, the spindle 200 may have an axial cross section that forms a triangle. The core support surfaces 206 preferably extend substantially axially with respect to the spindle (transversely with respect to the material path or machine direction in the embodiment of FIG. 2) to help in sliding a web roll core 133 on and off the spindle.

By providing the recessed areas between the core support portions 206 provides the spindle with a discontinuous support surface in which the contact area it has with a core 133 of a supply web roll 134 can be reduced compared to traditional, continuous-surface cylindrical spindles. This reduces the friction between the spindle 200 and core 133, allowing the core 133 to be more easily inserted and slid off from the spindle 200. Additionally, as is common and can be seen in FIG. 4, the core 133 can be deformed, such as by damage during shipping of the supply material roll 134. Damaged, out-of-round cores can be very difficult or impossible to insert onto a fully cylindrical spindle. The recessed areas 208 on the discontinuous spindle surface can accommodate deformations of the core 133 that extend inwardly between the core support portions 206, allowing dented or flattened cores to remain useable. In this way, the core support surfaces 206 *a,b,c* or a plurality of grip elements 210 which extend from the core support surfaces 206 *a,b,c*, may contacts or occupy only a fraction of the outer core surface circumference. The plurality of contacts may contact a finite number of points within an internal surface of a hollow tube onto which the web of material is rolled. In various examples, the plurality of grip elements 210 may extend beyond the generally cylindrical shape shown by line 207. The plurality of contacts may form a larger diameter around the spindle than the size of the inner diameter of inner support tube 133. This structure would allow the plurality of contacts to engage in an interference fit with the core 133 while the minimized outer cylindrical surface segments 206 *a,b,c* minimize other contact within the core 133. Preferably, the grip elements 210 are biased outwardly and are resiliently movable inwardly into the spindle 200. Such bias can be provided by springs within the spindle. The outer surface of the grip elements 210 can be spherical, conical, or have another shape that preferably facilitates sliding of the core 133 during loading and unloading on or from the spindle, and that grips the inner surface of the core 133 during use, to help transfer torque from the spindle to the roll, and preferably from the brake 137, described below. A chamfer 204 at the end of tip portion 204 may additionally reduce the effort of inserting spindle 200 into the inner support tube 133.

Referring back to FIGS. 2-6, the support element 136 may be connected with a brake 137. The brake 137 may prevent or inhibit bunching up of the web material 100 and maintain a desired tension in the web material 100 as it is unwound from the roll 134 and as it is fed onto and/or into the inflation and sealing mechanism. The brake 137 may prevent or inhibit release of the bulk uninflated material from the support 136. For example, the brake 137 may inhibit the free unwinding of the roll 134. The brake may also assure that the roll 134 is unwound at a steady and controlled rate. The brake 137 may be provided by any mechanism that provides control. For example, according to one embodiment, a spring-loaded leather strap or other friction mechanism can be used as a drag brake on the bulk material support 136. In another embodiment, the brake 137 may be an electric motor or other actuator used to provide resistance to the rotation of the bulk material support 136 as the roll 134 is unwound. As shown in FIGS. 7-8, the support element 136 is spindle 200 which is axially connected to a brake which may operate as a resistance mechanism. The resistance mechanism resists rotation of the support element 136 (e.g. spindle 200). The resistance mechanism may be motor 220 which controls rotation of the spindle 200, thereby controlling advancement of the web 100 by either positively driving rotation of spindle 200 or retarding the rotation of spindle 200. By retarding the rotation of spindle 200, the brake can also increase tension on the twisted web proximal to the support member 141, maintaining proper alignment with the inflating/sealing mechanism.

Preferably, the inflation and sealing device 101 is configured for continuous inflation of the web 100 as it is unraveled from the roll 134. The roll 134, preferably, comprises a plurality of chain of chambers 120 that are arranged in series. To begin manufacturing the inflated pillows from the web material 100, the inflation opening 116 of the web 100 is inserted around an inflation assembly, such as an inflation nozzle 140. In the embodiment shown in FIG. 2, preferably, the web 100 is advanced over the inflation nozzle 140 with the chambers 120 extending transversely with respect to the inflation nozzle 140 and outlet 146. The outlet 146, which can be disposed on a radial side and/or the upstream tip of the nozzle 140, for example, directs fluid from nozzle body 144 into the chambers 120 to inflate the chambers 120 as the web 100 advances along the material path "E" in a longitudinal direction "A". The inflated web 100 is then sealed by a sealing drum 166 in the sealing area 174 to form a chain of inflated pillows or cushions.

The side inflation area 168 in the embodiment of FIG. 3 is shown as the portion of the inflation and sealing device 101 along the path "E" adjacent the side outlets 146 in which air from the side outlets 146 can inflate the chambers 120. In some embodiments, the inflation area 168 is the area disposed between the inflation tip 142 and entry pinch area 176, described below. The web 100 is inserted around the inflation nozzle 140 at the inflation tip 142, which may be disposed at the forward-most end of the inflation nozzle 140. The inflation nozzle 140 inserts fluid, such as pressured air, along fluid path B into the uninflated web material through nozzle outlets, inflating the material into inflated pillows or cushions 120. The inflation nozzle 140 can include a nozzle inflation channel that fluidly connects a fluid source with the nozzle outlets. It is appreciated that in other configurations, the fluid can be other suitable pressured gas, foam, or liquid. FIGS. 3, 9, 10, and 11 illustrates a various view of the inflation and sealing device 101. As discussed in various embodiments, the fluid source can be disposed behind the support member 141 having a horizontal plate 183 and vertical plate 184 or other structural support for the nozzle and sealing assemblies, and preferably behind the inflation nozzle 140. The fluid source is connected to and feeds the fluid inflation nozzle conduit 143 The web 100 is fed over the inflation nozzle 140, which directs the web to the inflation and sealing assembly 103. The web 100 is advanced or driven through the inflation and sealing device 101 by a drive mechanism, such as by a driver or sealing drum 166 or the roller 160, in a downstream direction along a material path "E".

In accordance with various embodiments, the nozzle, blower sealing assembly, and drive mechanisms, and their various components or related systems may be structured, positioned, and operated as disclosed in any of the various embodiments described in the incorporated references such as for example U.S. patent application Ser. No. 13/844,741. Each of these embodiments may be incorporated to the inflation and sealing device 101 as discussed herein.

After being fed through the web feed area 164, the first and second web layers 105,107 are sealed together by the sealing assembly and exit the sealing drum 166. The sealing drum 166 includes heating elements, such as thermocouples, which melt, fuse, join, bind, or unite together the two web layers 105,107, or other types of welding or sealing elements. The web 100 is continuously advanced through the sealing assembly along the material path "E" and past the sealing drum 166 at a sealing area 174 to form a continuous longitudinal seal 170 along the web by sealing the first and second web layers 105,107 together, and exits the sealing area at an exit pinch area 178. The exit pinch area 178 is the area disposed downstream the entry pinch area 176 between the belt 162 and the sealing drum 166, as shown in FIG. 4. The sealing area 174 is the area between the entry pinch area 176 and exit pinch area 178 in which the web 100 is being sealed by the sealing drum 166. The longitudinal seal 170 is shown as the phantom line in FIGS. 1A-D. Preferably, the longitudinal seal 170 is disposed a transverse distance from the first longitudinal edge 102,106, and, most preferably, the longitudinal seal 170 is disposed along the mouths 125 of each of the chambers 120.

Preferably, as shown in FIG. 4, the sealing drum 166 is arranged above the belt 162. The roller 160 is preferably positioned downstream the feed roller 158 and tension roller 156 with the sealing drum 166 there between. The sealing drum 166 is disposed such that a portion of the sealing drum 166 vertically overlaps the feed roller 158, tension roller 156, and roller 160 so that the belt 162 is deformed at the sealing area 174 to have a generally U-configuration. Such configuration increases the tension of the belt 162 at the sealing area 174, and facilitates the pinching of the web 100 between the sealing drum 166 and the belt 162 at the sealing area 174. The inflation and sealing assembly 103 configuration described also reduces the amount of contact of the web 100 during sealing, which reduces bending of the inflated web. As shown in FIG. 7, the contact area is the sealing area 174 between the entering pinch area 164 and exiting pinch area 174.

In the embodiment shown, the web 100 enters the sealing assembly at the entry pinch area 176 at an angle sloping downward with respect to the horizontal. Additionally, the web 100 exits the sealing area 174 at an angle sloping upward with the respect to the horizontal so that the web 100 is exiting facing upwards toward the user. By having the intake and outtake sloped as described herein, the inflation and sealing device 101 allows for easy loading and extracting of the web as well as easy access to the web. Thus, the inflation and sealing device 101 can be positioned below eye level, such as on a table top, without the need of a high stand. The sloping downward intake and sloping upward outtake of the web 100 from the sealing assembly provides for the material path "E" to be bent at an angle between the entry pinch area 176 and the exit pinch area 178 (the entry pinch area 176 and exit pinch area 178 are further described below). The angle between the entry pinch area 176 and exit pinch area 178 is, for example, at least about 40° up to at most about 180°. The angle between the entry pinch area 176 and exit pinch area 178 may be about 90°. Other entry and exit angles can be employed as known in the art in alternative embodiments.

In accordance with various embodiments, the sealing assembly may be protected by a removable cover. Likewise, the belt mechanism, e.g. belt 162, tension roller 156, and feed roller 158 may also include a removable cover 173. This allows for a user to easily remove the web or clear up or fix jams within the machine.

In accordance with various embodiments, one or more of the elements of inflation and sealing device 101 may drive web 100 through the system. For example, the sealing drum 166 may be connected to a motor which rotates it in a direction "F". As described in various embodiments (see e.g. application Ser. No. 13/844,741), other elements may also drive the system, such as roller 160. In other embodiments discussed in the incorporated references, roller 160 is indicated as a drive roller; however, it may be noted that roller 160 may be either an idler roller or an active drive roller. For example, roller 160 may be connected to the same motor or the same drive mechanism associated with the sealer drum 166 that causes the drum to rotate. In other configurations, the sealing drum 166 may be passive (e.g. an idler) or actively driven by a motor. In one example, the sealing drum 166 may be passive and merely be rotated in response to the advancing web 100 or belt 162.

In accordance with various embodiments, the inflation and sealing device can have more than one belt. For example one belt may drive the various rollers and a second belt may pinch the web against the sealing drum. In various embodiments, the inflation and sealing device may have no belts. For example the sealing drum may pinch the web against a stationary platform and drive the web thorough the inflation and sealing device at the same time. Additional description and embodiments of such structures may be disclosed in U.S. Pat. Nos. 8,061,110 and 8,128,770 and Publication No. 2011/0172072 each of which is herein incorporated by reference.

Figure 10:
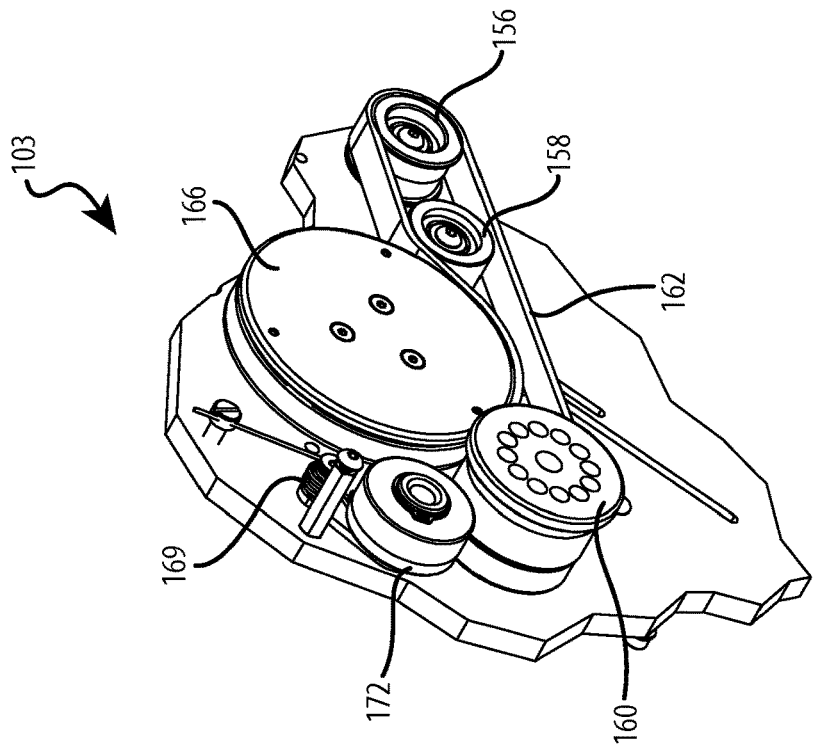
FIG. 10 is a front, right perspective view thereof.
Figure 9:
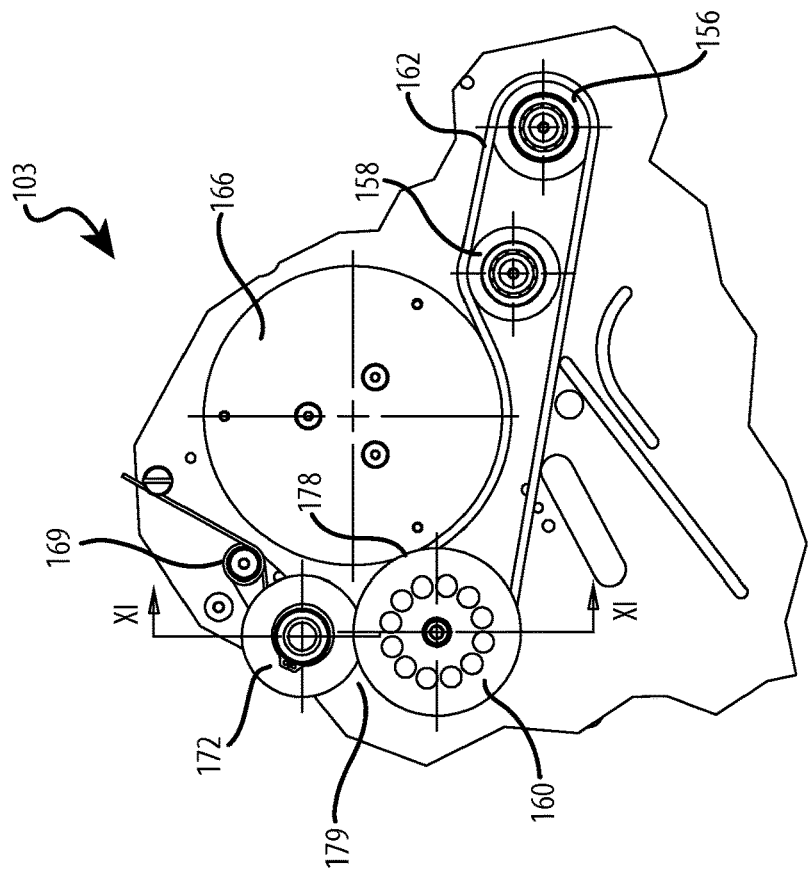
FIG. 9 is a right-side view of a sealing mechanism of the device of FIG. 2.
Figure 11:
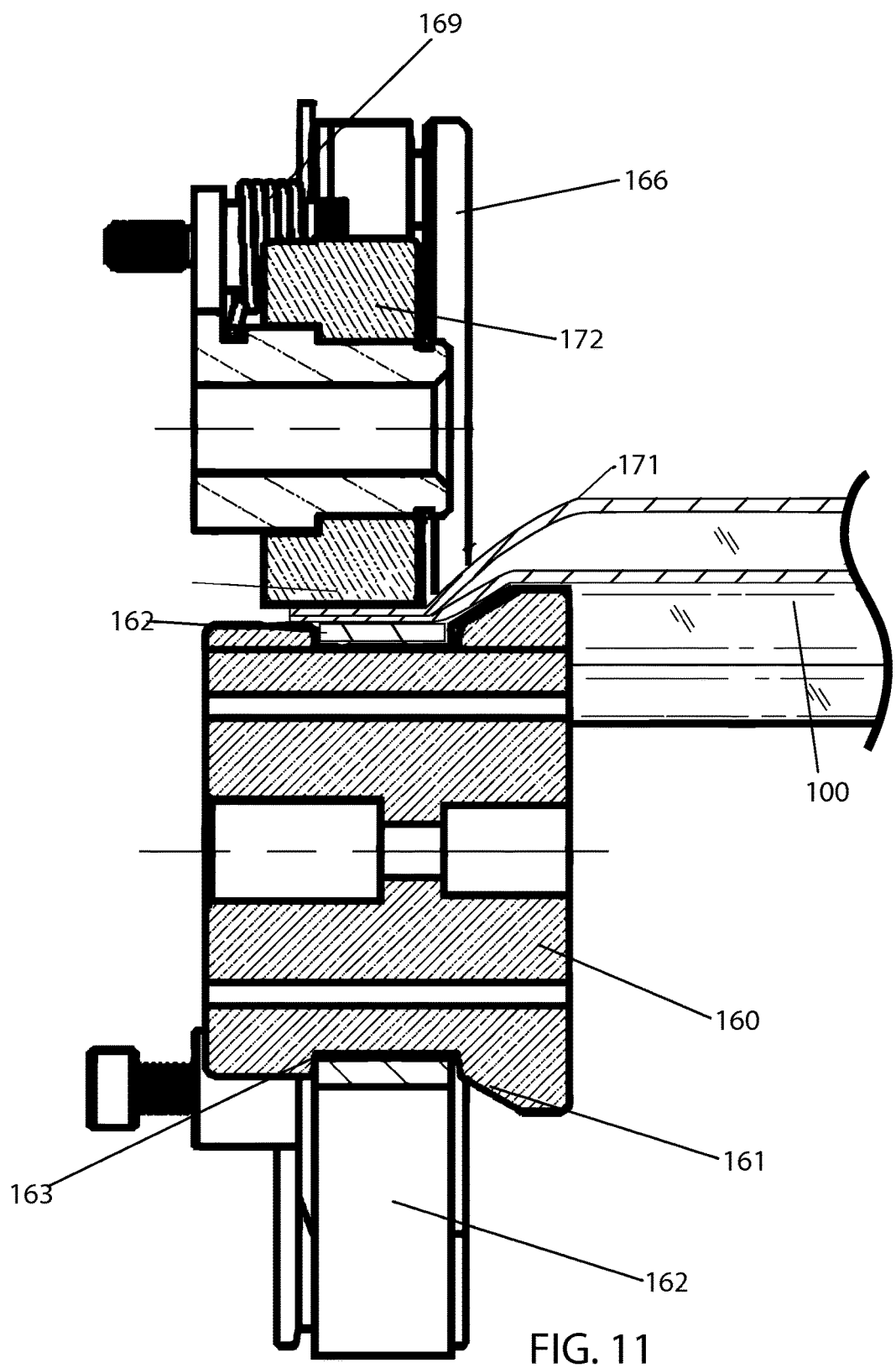
FIG. 11 is a front, cross-sectional view of post-sealing control elements taken along line XI-XI of FIG. 9.

Although some embodiments do not have a post-seal control element, the inflation and sealing assembly 103 shown in FIG. 2 includes a plurality of post-seal control elements. In various embodiments, the post-seal control element may be a movable or stationary surface, a roller, or any device that can contact the belt 162 or the web 100. For example, a post-seal control element can include roller 160 as discussed above. The roller 160 supports the web 100 exiting from the inflation and sealing assembly 103 and may be operable to guide the belt. As illustrated in FIGS. 9-11, the roller 172 may also be a post-seal control element. In various embodiments, there may be a single post-seal control element such as roller 160 as depicted in embodiments disclosed in the incorporated references (see e.g. Ser. No. 13/844,741). In other embodiments, there may be multiple post-seal control elements as illustrated in FIGS. 9-11. For example, a post-seal control element (e.g. roller 172) can be disposed directly above a post-seal control element (e.g. roller 160).

The two post-seal control elements (e.g. two rollers 160,172) pinch or press the web 100 so that the belt 162 abuts one or both of the surfaces of the elements. This area may be a holding region operable to maintain contact between sealed portion of the film until the seal is fully formed. As the rollers 160,173 are disposed immediately downstream of the heating drum (or other heating mechanism in other embodiments), they provide a cooling region 179 disposed between two rollers 160,172. Roller 160 in this embodiment acts as a principle cooling roller, since the sealed and cooling film is drawn around this roller 160. Pinch roller 172 maintains the web in contact with the principle cooling roller 160 to help maintain the pressure between the two film layers as the seal cools to support the seal and surrounding area mechanically. In embodiments, such as the one shown, in which the belt 162 extends around roller 160, the outer surface of this roller remain substantially stationary with respect to the web 100, further helping support the seal in its delicate state before it has cooled sufficiently. Roller 160 is typically made of a hard and tough material, such as steel or aluminum, to withstand the pressures and heat from the belt 162, although a plastic or other material could be used in some embodiments. As discussed herein the Roller 160 may be formed from a non-stick material or coated with a non-stick coating such as polytetrafluoroethylene (PTFE).

In various embodiments, the post-seal control element such as roller 172 may have a larger-diameter area 171 opposing the belt than in adjacent parts of pinch roller 172. This annular ridge 171 allows contact against the web 100, while an adjacent smaller-diameter portion of roller 172 can remain out of contact therewith to help prevent sticking to the hot web. The roller 172 may be biased against the belt 162, web 100, and roller 160 by a spring-loaded tensioner 169. The tension provided by the tensioner 169 may further hold the seal closed by the post-seal control element, and can allow the pinch roller 172 to be lifted off the web when needed.

To prevent or reduce sticking of the hot web 100 to the pinch roller 172, the pinch roller is preferably made of, or has a surface of, a non-stick or low adhesion material such as polytetrafluoroethylene (PTFE) or other suitable material as discussed below. In accordance with various embodiments, the post-seal control element such as roller 160 may include a recessed annular surface 163. The recessed annular surface 163 may receive the belt 162.

When the web exits pinch area 178 between rollers 160 and 172 (these two rollers 160, 172 are at the exit of the sealing mechanism, such as the downstream exit from the device) there is a possibility that the hot film will stick to one of these rollers instead of cleanly exiting the device. In various embodiments, an element can be provided to help separate the film from the post-seal control elements. For example, roller 160 can have an annular ridge 161 extending proud the belt 162 or outer surface 167 of the roller 160 that supports the belt 162 against the web 100, or that contacts the web 100. This ridge 161 can be annular or have another suitable shape and can run around the roller to contact the web 100, preferably transversely adjacent the longitudinal seal on the inflated web 100, such as against the transverse end of the inflated chambers 120 adjacent the longitudinal seal 112. At the pinch area 178, the annular ridge 161 contacts the web 100, typically against a transverse side of the inflated chambers 120 where due to the inflated shape, the chambers 120 have a degree of rigidity compared to the uninflated film. The elevated ridge provides a bump-off element that forcing the web 100 to deflect off the roller 160. The annular ridge 161 is a second surface that causes the web to bend. The bend may cause a portion of the web 100, located in the lateral direction relative to a first portion of the web 100 that is pressed between the first post-seal control element (e.g. roller 160) and the second post-seal control element (e.g. roller 172), to not stay in the same plane as the first portion of the web. Forcing different portions of web 100 into different planes may cause the web 100 to unseat, and often unstick, from the belt and/or the roller 160. As such, the annular ridge 161 aids in automatically peeling the web 100 off the post-seal control elements. While described with respect to a roller, alternative embodiments can have a stationary ridge provided adjacent the roller 160 to guide the web off the cylinder.

As the heated web 100 may have a tendency to stick to the post-seal control elements, non-stick materials may mitigate this issue. For example, one or both post-seal control elements may be made from of coated with polytetrafluoroethylene (PTFE). Other non-stick materials may also be used including anodized aluminum, ceramic, silicone, or like non-stick/low-adhesion materials. However, even these materials may still be coated with polytetrafluoroethylene (PTFE).

In the embodiment shown, the inflation and sealing device 101 further includes a cutting assembly to cut the web off the inflation nozzle when an inflation channel that receives and is closed around a longitudinal inflation nozzle 140 is used. As with other system components discussed herein, the cutting assembly may also be structured, provided, or included in accordance with the various embodiments described by the incorporated references discussed above.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range. The content of U.S. patent application Ser. No. 13/844,741 is hereby incorporated by reference in its entirety.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A web inflation device comprising:
a plurality of film handling elements that have film supporting portions that support and direct an inflatable web of film in a longitudinal direction along a path, wherein the plurality of film handling elements includes:
a supply support element that supports a supply of the web in an uninflated state;
an inflation mechanism comprising a nozzle operable to inflate the web with a fluid by directing the fluid between superimposed plies of the web; and
a sealing mechanism operable to seal the plies together to seal the fluid therein;
wherein angled two of the film supporting portions are disposed upstream of the nozzle and extend in non-parallel directions transverse to the longitudinal direction to cause an increased tautness in the web at the nozzle compared to a lesser tautness in a region of the web spaced transversely from the nozzle at a same longitudinal location along the path.

2. The device of claim 1, wherein the transverse directions in which the two film supporting portions extend are inclined with respect to each other measured rotationally about the longitudinal direction to cause the difference in tautness.

3. The device of claim 1, wherein:
the plurality of film handling elements includes a guide member disposed along the path between the supply support element and the inflation mechanism; and
each of the two angled film supporting portions are provided by a respective one of the supply support element and the guide member, such that the web travelling along the path is tauter at one transverse end of the guide member than the other.

4. The device of claim 3, wherein:
the supply support element comprises a spindle that supports a web arranged in a roll, the spindle having a spindle axis;
the guide member has a film contacting surface that contacts and guides the film along the longitudinal direction of the path; and
the spindle axis and the film contacting surface are nonparallel in the transverse direction inclined with respect to each other as measured about the longitudinal direction.

5. The device of claim 4, wherein the nozzle extends longitudinally along the path for reception in an inflation channel between the plies, wherein the guide member is disposed between the supply support element and the nozzle and inclined with respect to the spindle axis to increase tautness in the web upstream of the nozzle for smoothing the transition of the web onto the nozzle.

6. The device of claim 5, wherein the guide member is positioned to produce a bend in the longitudinal direction of the path, the spindle axis being inclined with respect to the guide member to define a deeper bend at a first transverse location closer to the nozzle than at second transverse location farther away from the nozzle at the same longitudinal location of the film.

7. The device of claim 1, wherein the angled two of the film supporting portions are provided by respective ones of the two film handling elements disposed immediately upstream of the nozzle.

8. The device of claim 1, wherein one of the angled two film supporting portions is provided by the supply support element and the other one of the angle two film supporting portions is provided by a second film handling element, and wherein the supply support element and the second film handling element are arranged relative to one another such that an angle defined between a portion of the web upstream of the second film handling element and a portion of the web downstream of the film handling element increases as the web is depleted from the supply of inflatable web.

9. A web inflation device comprising:
a plurality of film handling elements that have film supporting portions that support and direct an inflatable web of film in a longitudinal direction along a path, the film handling elements including:
a supply support element that supports a supply of the web in an uninflated state;

an inflation mechanism that includes a nozzle operable to inflate the web with a fluid by directing the fluid between superimposed plies of the web;

a sealing mechanism operable to seal the plies together to seal the fluid therein; and a guide member disposed along the path between the supply support element and the nozzle, wherein the guide member has first and second portions disposed at respective first and second transverse locations transversely spaced from each other, with the first transverse location nearer to the nozzle than the second transverse location;

wherein the guide member and the supply support element are positioned relative to one another to define a bend in the path extending around the guide member, wherein the bend defined around the first portion is deeper than the bend defined around the second portion to increase tautness of the web downstream of the first portion compared to the web downstream of the second portion.

10. The device of claim 9, wherein the supply support element, the inflation assembly, and the sealing assembly are all positioned relative to one another to define a circuitous path to be traversed by the web.

11. The device of claim 9, wherein the path includes a plurality of direction changes for the web when traversing the path with each direction change of the plurality of direction changes being characterized by at least one curve that describes the direction change and by a transversely extending central axis defined by geometry of the at least one curve, wherein at least one or more of the central axes include a non-parallel direction with respect to the supply support element.

12. The device of claim 9, wherein an angle between axes of the guide element and the support element is from about 10° to about 45°.

13. The device of claim 9, wherein the supply support element is a rotatable spindle.

14. The device of claim 9, wherein the supply support element is axially connected to a brake that resists rotation of the supply support element.

15. The device of claim 14, wherein the brake is a motor that controls rotation of the supply support element thereby controlling tension in web as the web traverses the path.

16. The device of claim 9, wherein the guide member and the supply support element are inclined at different angles selected to cause the difference in depth of the bends around the first and second portions.

* * * * *

UNITED STATES PATENT AND TRADEMARK OFFICE
CERTIFICATE OF CORRECTION

PATENT NO. : 10,328,653 B2  
APPLICATION NO. : 14/630642  
DATED : June 25, 2019  
INVENTOR(S) : Thomas D. Wetsch Page 1 of 1

It is certified that error appears in the above-identified patent and that said Letters Patent is hereby corrected as shown below:

In the Claims

At Column 18, Claim 1, Line number 1, insert --an-- before "angled two".

Signed and Sealed this  
Twenty-second Day of December, 2020

Andrei Iancu  
*Director of the United States Patent and Trademark Office*